United States Patent
Douady et al.

(10) Patent No.: US 12,289,523 B2
(45) Date of Patent: Apr. 29, 2025

(54) SYSTEMS AND METHODS FOR STABILIZING VIDEOS

(71) Applicant: GoPro, Inc., San Mateo, CA (US)

(72) Inventors: César Douady, Orsay (FR); Thomas Derbanne, Paris (FR); Maxim Karpushin, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 18/331,645

(22) Filed: Jun. 8, 2023

(65) Prior Publication Data

US 2023/0319408 A1 Oct. 5, 2023

Related U.S. Application Data

(63) Continuation of application No. 17/452,760, filed on Oct. 28, 2021, now Pat. No. 11,678,053, which is a
(Continued)

(51) Int. Cl.
| | |
|---|---|
| *H04N 23/68* | (2023.01) |
| *H04N 5/14* | (2006.01) |
| *H04N 23/51* | (2023.01) |
| *H04N 23/54* | (2023.01) |
| *H04N 23/55* | (2023.01) |
| *H04N 23/63* | (2023.01) |

(52) U.S. Cl.
CPC ........... *H04N 23/685* (2023.01); *H04N 5/144* (2013.01); *H04N 23/51* (2023.01); *H04N 23/54* (2023.01); *H04N 23/55* (2023.01); *H04N 23/631* (2023.01); *H04N 23/6812* (2023.01); *H04N 23/683* (2023.01)

(58) Field of Classification Search
CPC .... H04N 5/144; H04N 5/2252; H04N 5/2253; H04N 5/2254; H04N 5/23258; H04N 5/23267; H04N 5/2328; H04N 5/232933
See application file for complete search history.

(56) References Cited

U.S. PATENT DOCUMENTS

| | | | |
|---|---|---|---|
| 4,864,409 A | 9/1989 | Platte | |
| 4,959,725 A | 9/1990 | Mandle | |
| (Continued) | | | |

FOREIGN PATENT DOCUMENTS

| | | |
|---|---|---|
| CN | 101189870 | 5/2008 |
| CN | 101511024 | 8/2009 |
| (Continued) | | |

OTHER PUBLICATIONS

Extended European Search Report issued in App. No. EP23173083, dated Dec. 6, 2023, 8 pages.
(Continued)

*Primary Examiner* — Amy R Hsu
(74) *Attorney, Agent, or Firm* — Esplin & Associates, PC

(57) ABSTRACT

Visual content is captured by an image capture device during a capture duration. The image capture devices experiences change in position during the capture duration. The trajectory of the image capture device is smoothed based on a look ahead of the trajectory. A punchout of the visual content is determined based on the smoothed trajectory. The punchout of the visual content is used to generate stabilized visual content.

20 Claims, 9 Drawing Sheets

Related U.S. Application Data continuation of application No. 16/587,811, filed on Sep. 30, 2019, now Pat. No. 11,172,130, which is a continuation of application No. 16/548,549, filed on Aug. 22, 2019, now Pat. No. 10,536,643, which is a continuation of application No. 16/392,501, filed on Apr. 23, 2019, now Pat. No. 10,432,864.

(60) Provisional application No. 62/733,237, filed on Sep. 19, 2018.

(56) References Cited

U.S. PATENT DOCUMENTS

| | | |
|---|---|---|
| 6,654,019 B2 | 11/2003 | Gilbert |
| 6,982,746 B1 | 1/2006 | Kawahara |
| 7,623,153 B2 | 11/2009 | Hatanaka |
| 7,697,725 B2 | 4/2010 | Bums |
| 8,022,948 B2 | 9/2011 | Garbow |
| 8,159,541 B2 | 4/2012 | Mcleod |
| 8,237,787 B2 | 8/2012 | Hollinger |
| 8,531,535 B2 | 9/2013 | Kwatra |
| 8,994,838 B2 | 3/2015 | Sokeila |
| 9,066,014 B2 | 6/2015 | Karpenko |
| 9,071,756 B2 | 6/2015 | Karpenko |
| 9,144,714 B2 | 9/2015 | Hollinger |
| 9,279,983 B1 | 3/2016 | Davis |
| 9,300,871 B2 | 3/2016 | Zhou |
| 9,363,569 B1 | 6/2016 | Van Hoff |
| 9,374,532 B2 | 6/2016 | Grundmann |
| 9,426,430 B2 | 8/2016 | Aguilar |
| 9,674,438 B2 | 6/2017 | Zhou |
| 9,697,587 B2 | 7/2017 | Yuan |
| 9,743,060 B1 | 8/2017 | Matias |
| 9,787,902 B1* | 10/2017 | Beysserie ............ H04N 23/683 |
| 9,819,857 B2 | 11/2017 | Miyajima |
| 9,824,426 B2 | 11/2017 | Wu |
| 9,888,179 B1 | 2/2018 | Liang |
| 9,922,398 B1 | 3/2018 | Jenny |
| 10,015,308 B2 | 7/2018 | Cho |
| 10,027,893 B2 | 7/2018 | Bell |
| 10,158,802 B2 | 12/2018 | Cai |
| 10,262,691 B1 | 4/2019 | Gilmour |
| 10,271,021 B2 | 4/2019 | Smolyanskiy |
| 10,284,794 B1 | 5/2019 | Francois |
| 10,341,564 B1* | 7/2019 | Derbanne ............ H04N 23/683 |
| 10,432,864 B1* | 10/2019 | Douady ................ H04N 5/144 |
| 10,462,370 B2 | 10/2019 | Shi |
| 10,536,643 B1 | 1/2020 | Douady |
| 10,542,215 B2 | 1/2020 | Kunishige |
| 10,574,894 B2 | 2/2020 | Derbanne |
| 10,587,807 B2 | 3/2020 | Derbanne |
| 10,587,808 B2 | 3/2020 | Derbanne |
| 10,607,313 B2 | 3/2020 | Jenny |
| 10,750,092 B2 | 8/2020 | Douady |
| 10,958,840 B2 | 3/2021 | Douady |
| 11,025,824 B2 | 6/2021 | Derbanne |
| 11,172,130 B2 | 11/2021 | Douady |
| 11,228,712 B2 | 1/2022 | Douady |
| 11,363,197 B2 | 6/2022 | Derbanne |
| 11,647,289 B2 | 5/2023 | Douady |
| 11,696,027 B2 | 7/2023 | Derbanne |
| 2003/0160862 A1 | 8/2003 | Charlier |
| 2003/0210327 A1 | 11/2003 | Mory |
| 2004/0010804 A1 | 1/2004 | Hendricks |
| 2004/0125133 A1 | 7/2004 | Pea |
| 2006/0291841 A1 | 12/2006 | Fukumoto |
| 2007/0236578 A1 | 10/2007 | Nagaraj |
| 2008/0037970 A1 | 2/2008 | Saito |
| 2008/0307329 A1 | 12/2008 | Endoh |
| 2009/0278917 A1 | 11/2009 | Dobbins |
| 2010/0033614 A1 | 2/2010 | Yoo |
| 2010/0053347 A1 | 3/2010 | Agarwala |
| 2010/0277617 A1 | 11/2010 | Hollinger |
| 2010/0281375 A1 | 11/2010 | Pendergast |
| 2010/0299630 A1 | 11/2010 | Mccutchen |
| 2011/0013778 A1 | 1/2011 | Takumai |
| 2011/0063236 A1 | 3/2011 | Arai |
| 2011/0102609 A1 | 5/2011 | Iwata |
| 2011/0242352 A1 | 10/2011 | Hikosaka |
| 2012/0081558 A1 | 4/2012 | Ogura |
| 2012/0105654 A1* | 5/2012 | Kwatra ..................... G06T 3/00 |
| | | 348/208.4 |
| 2012/0137236 A1 | 5/2012 | Abe |
| 2012/0206565 A1 | 8/2012 | Villmer |
| 2013/0002813 A1 | 1/2013 | Vaught |
| 2013/0044228 A1 | 2/2013 | Corey |
| 2013/0058535 A1 | 3/2013 | Othmezouri |
| 2013/0083202 A1 | 4/2013 | Batur |
| 2013/0141600 A1 | 6/2013 | Proca |
| 2013/0163815 A1 | 6/2013 | Mai |
| 2013/0163947 A1 | 6/2013 | O'Neill |
| 2013/0177168 A1 | 7/2013 | Inha |
| 2013/0182134 A1* | 7/2013 | Grundmann .......... H04N 23/683 |
| | | 348/208.6 |
| 2013/0210563 A1 | 8/2013 | Hollinger |
| 2013/0235221 A1 | 9/2013 | Zhou |
| 2013/0250047 A1 | 9/2013 | Hollinger |
| 2013/0329132 A1 | 12/2013 | Tico |
| 2013/0343728 A1 | 12/2013 | Kitatani |
| 2014/0028876 A1 | 1/2014 | Mills |
| 2014/0039884 A1 | 2/2014 | Chen |
| 2014/0063271 A1 | 3/2014 | Ogura |
| 2014/0063272 A1 | 3/2014 | Tsuchida |
| 2014/0160309 A1 | 6/2014 | Karpenko |
| 2014/0198852 A1 | 7/2014 | Incesu |
| 2014/0266773 A1 | 9/2014 | Aguilar |
| 2014/0267586 A1 | 9/2014 | Aguilar |
| 2014/0267590 A1 | 9/2014 | Mcclatchie |
| 2015/0022677 A1* | 1/2015 | Guo ................... H04N 23/6811 |
| | | 348/208.1 |
| 2015/0029306 A1 | 1/2015 | Cho |
| 2015/0146014 A1 | 5/2015 | Black |
| 2015/0159846 A1 | 6/2015 | Hollinger |
| 2015/0189178 A1 | 7/2015 | Lombardi |
| 2015/0256755 A1 | 9/2015 | Wu |
| 2015/0281587 A1 | 10/2015 | Furuta |
| 2015/0324636 A1 | 11/2015 | Bentley |
| 2015/0350548 A1* | 12/2015 | Beysserie ............ H04N 23/683 |
| | | 348/208.6 |
| 2016/0006935 A1* | 1/2016 | Zhou ................... H04N 23/683 |
| | | 348/208.1 |
| 2016/0048216 A1 | 2/2016 | Fink |
| 2016/0124917 A1 | 5/2016 | Ducat |
| 2016/0148648 A1 | 5/2016 | Dimson |
| 2016/0173782 A1 | 6/2016 | Dimson |
| 2016/0191800 A1 | 6/2016 | Yoshikawa |
| 2016/0212345 A1 | 7/2016 | Van Cruyningen |
| 2016/0224225 A1 | 8/2016 | Kondo |
| 2016/0227105 A1 | 8/2016 | Kobayashi |
| 2016/0255273 A1 | 9/2016 | Wakamatsu |
| 2016/0255293 A1 | 9/2016 | Gesset |
| 2016/0360109 A1 | 12/2016 | Laroia |
| 2017/0041545 A1 | 2/2017 | Murgia |
| 2017/0070689 A1 | 3/2017 | Silverstein |
| 2017/0078577 A1 | 3/2017 | Wakamatsu |
| 2017/0084086 A1 | 3/2017 | Pio |
| 2017/0085740 A1 | 3/2017 | Lin |
| 2017/0085964 A1 | 3/2017 | Chen |
| 2017/0094169 A1 | 3/2017 | Yoshikawa |
| 2017/0142337 A1 | 5/2017 | Kokaram |
| 2017/0230581 A1 | 8/2017 | Cai |
| 2017/0249859 A1 | 8/2017 | Siminou |
| 2017/0289454 A1 | 10/2017 | Pettersson |
| 2017/0302852 A1 | 10/2017 | Lam |
| 2017/0332018 A1 | 11/2017 | Bell |
| 2017/0353661 A1 | 12/2017 | Kawamura |
| 2017/0359534 A1 | 12/2017 | Li |
| 2018/0041705 A1 | 2/2018 | Wakamatsu |
| 2018/0041707 A1 | 2/2018 | Beysserie |
| 2018/0048821 A1 | 2/2018 | Segapelli |
| 2018/0121057 A1 | 5/2018 | Liang |
| 2018/0167558 A1 | 6/2018 | Hirai |
| 2018/0199025 A1 | 7/2018 | Holzer |
| 2018/0211359 A1 | 7/2018 | Jenny |

(56) References Cited

U.S. PATENT DOCUMENTS

| | | | |
|---|---|---|---|
| 2018/0220073 | A1 | 8/2018 | Keal |
| 2018/0309930 | A1 | 10/2018 | Gyotoku |
| 2018/0324358 | A1 | 11/2018 | Yamada |
| 2018/0359414 | A1 | 12/2018 | Wang |
| 2019/0058821 | A1 | 2/2019 | Lee |
| 2019/0124267 | A1 | 4/2019 | Haruna |
| 2019/0191090 | A1 | 6/2019 | Murashima |
| 2019/0215495 | A1 | 7/2019 | Smolyanskiy |
| 2019/0243131 | A1 | 8/2019 | Yi |
| 2019/0348075 | A1 | 11/2019 | Derbanne |
| 2019/0356856 | A1 | 11/2019 | Derbanne |
| 2019/0356857 | A1 | 11/2019 | Derbanne |
| 2019/0379834 | A1 | 12/2019 | Derbanne |
| 2020/0092451 | A1 | 3/2020 | Douady |
| 2020/0092480 | A1 | 3/2020 | Douady |
| 2020/0120252 | A1 | 4/2020 | Douady |
| 2020/0177813 | A1 | 6/2020 | Derbanne |
| 2020/0374442 | A1 | 11/2020 | Douady |
| 2021/0289138 | A1 | 9/2021 | Derbanne |
| 2022/0053114 | A1 | 2/2022 | Douady |
| 2022/0141367 | A1 | 5/2022 | Douady |
| 2022/0303467 | A1 | 9/2022 | Derbanne |
| 2023/0171496 | A1 | 6/2023 | Douady |
| 2023/0345124 | A1 | 10/2023 | Derbanne |

FOREIGN PATENT DOCUMENTS

| | | | |
|---|---|---|---|
| CN | 101742122 | | 6/2010 |
| CN | 101794451 | | 8/2010 |
| CN | 102104767 | | 6/2011 |
| CN | 102202164 | | 9/2011 |
| CN | 103394199 | | 11/2013 |
| CN | 103402056 | | 11/2013 |
| CN | 103841297 | | 6/2014 |
| CN | 103988491 | | 8/2014 |
| CN | 104982027 | | 10/2015 |
| CN | 105141807 | | 12/2015 |
| CN | 105577984 | A | 5/2016 |
| CN | 105830009 | | 8/2016 |
| CN | 106027852 | | 10/2016 |
| CN | 106331480 | | 1/2017 |
| CN | 106550187 | A | 3/2017 |
| CN | 107079111 | | 8/2017 |
| CN | 107211092 | | 9/2017 |
| CN | 107466474 | | 12/2017 |
| CN | 108156441 | | 6/2018 |
| CN | 106331480 | B | 1/2020 |
| EP | 1515548 | A2 | 3/2005 |
| EP | 1802105 | | 6/2007 |
| EP | 2805482 | A1 | 11/2014 |
| EP | 2975576 | | 1/2016 |
| EP | 3794813 | A1 | 3/2021 |
| JP | 2005352988 | | 12/2005 |
| KR | 100777457 | B1 | 11/2007 |
| WO | 2009047572 | A1 | 4/2009 |
| WO | 2013109335 | A1 | 7/2013 |
| WO | 2014042104 | A1 | 3/2014 |
| WO | 2014090277 | A1 | 6/2014 |
| WO | 2016058496 | | 4/2016 |
| WO | 2016187411 | | 11/2016 |
| WO | 2017024305 | | 2/2017 |
| WO | 2017112800 | | 6/2017 |

OTHER PUBLICATIONS

Yu Jialin, Shu Jihan, and Song Zhiguo. "Based on the selection of special expeditions, all the division rates are determined." Electronic Information Science Review 37.5 (2015): 1141-1148.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

Extended European Search Report for App. No. EP19861548.6, dated Feb. 8, 2022, 7 pages.

International Search Report and Written Opinion for Application No. PCT/US2019/020241, date of mailing Jun. 3, 2019, 12 pages.

International Search Report and Written Opinion for Application No. PCT/US2019/031591, date of mailing Jun. 18, 2019, 7 pages.

International Search Report and Written Opinion for Application No. PCT/US2019/048292, dated Sep. 27, 2019, 7 pages.

International Search Report for Application No. PCT/US19/48368, date of mailing Nov. 7, 2019, 10 pages.

Kamali et al., "Stabilizing Omnidirectional Videos Using 3D Structure and Spherical Image Warping", MVA2011 IAPR Conference on Machine Vision Applications, Jun. 13-15, 2011, Nara, Japan, pp. 177-180. (Year: 2011).

Kopf et al., "First-person Hyper-Lapse Videos" ACM Transactions on Graphics (Proceedings of SIGGRAPH 2014), 33(4), Article No. 78, 2014 (10 pages).

O'donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >, 12 pages.

O'donovan, A., et al., "Real Time Capture of Audio Images and their Use with Video," 2007 IEEE Workshop on Applications of Signal Processing to Audio and Acoustics, Oct. 21-24, 2007, pp. 10-13.

PCT International Search Report and Written Opinion for PCT/US15/38913, Sep. 29, 2015, 15 Pages.

Office Action, U.S. Appl. No. 14/789,706, filed Jun. 7, 2016, 10 pages.

Apple Final Cut Pro X (e.g., INSTA360 1400-PA00002390, INSTA360 1400-PA00002524) 2017, 5 pages.

Ben Claremont, Insta360 Go: The Bite Sized steady-cam!, YouTube (Aug. 28, 2019), https://www.youtube.com/watch?v=HMOTYd3JXo8.

Canon EOS 6D (e.g., INSTA360 1400-PA000002777) 2018, 2 pages.

Daven Mathies, GoPro Hero (2018) Review, Digital Trends (Apr. 19, 2018), https://www.digitaltrends.com/photography/gopro-hero-2018-review/.

Daven Mathies, Insta360 Go review: Everyday life becomes a (boring) movie, DigitalTrends (Aug. 29, 2019), https://www.digitaltrends.com/photography/insta360-go-review/.

Erturk S., Digital image stabilization with sub-image phase correlation based global motion estimation[J]. IEEE Trans on Consumer Electronics, 2003, 49(4): 1320-1325 Nov. 2003.

Erturk S., Translation, rotation and scale stabilization of image sequences[J]. Electronics Letters, 2003, 39(17): 1245-1246 2003.

Fang et al., "A Video Stabilization Algorithm Based on Affine SIFT" Mar. 2018, 4 pages.

Google Pixel 2/2XL Phone (e.g., INSTA360 1400-PA00001701, INSTA360 1400-PA00001671, INSTA360 1400-PA00001596, INSTA360 1400-PA00001606) Dated Nov. 10, 2017. 11 pages.

GoPro Fusion /GoPro Fusion Studio (e.g., Photoxels, GoPro: Fusion Spherical Camera Captures Immersive 5.2K Spherical Content, (Sep. 29, 2017), Photoxels https://www.photoxels.com/gopro-fusion-spherical-camera-captures-immersive-5-2k-spherical-content-and-hero6-black-camera-gopro-app-automatically-transform-your-adventures-into-cinematic-quikstory-videos-in-4k-advanced-vid/.

GoPro HERO (2018 Edition) (e.g., GoPro, GoPro Launches Entry-Level Hero Camera 2018, GoPRo (Mar. 29, 2018), https://gopro.com/en/us/news/gopro-launches-entry-level-hero-camera-2018.

GoPro HERO5 Black / Ambarella (e.g., HERO5Black_UM_ENG_REVD_Web.pdf; GoPro Hero 5 with Image Stabilization—Does it Work for Mountain Biking?, https://www.youtube.com/watch?v=5EIOX8Ptlz8; https://gethypoxic.com/blogs/technical/gopro-hero5-for-skydiving) 2017.

GoPro HERO6 Black (e.g., HERO6Black Um Eng REVB.pdf, GoPro Hero 6 review_ Slow-mo, stabilization and subtle refinements.pdf; GoPro Hero 6 Stabilization // Enough to leave the gimbal at home?, https://www.youtube.com/watch?v=QUQ9vX8ZWcw; GoPro Hero6 Stabilization Comparison (with Hero5) GoPro Tip #594, https://www.youtube.com/watch?v=JL8QeHWOdUk) 2018.

(56) References Cited

OTHER PUBLICATIONS

Gopro, Introducing Fusion Studio, GoPRo (Nov. 21, 2017), https://gopro.com/en/au/news/introducing-fusion-studio.
Grundmann, Matthias, Vivek Kwatra, and Irfan Essa. "Auto-directed video stabilization with robust L1 optimal camera paths." IEEE Conference on Computer Vision and Pattern Recognition (CVPR) . IEEE, 2011. pp. 225-232.
Hanning et al. "Stabilizing cell phone video using inertial measurement sensors." In: 2011 International Conference on Computer Vision Workshops (ICCV Workshops). Nov. 13, 2011 (Nov. 13, 2011) Retrieved on Aug. 12, 2020 (Aug. 12, 2020) from <http://people.isy.liu.se/en/cvl/perfo/papers/hanning_iwmv11.pdf>.
Insta360 Go (1.2.0) (e.g., Insta360, Downloads | Insta360 GO, https://www.insta360.com/download/insta360-go.
Insta360 Nano (e.g., INSTA360 1400-PA00002724, INSTA360 1400-PA00002722, INSTA360 1400-PA00002729) (May 25, 2017) 54 pages.
Insta360 One (e.g., INSTA360 1400-PA00002777, INSTA360 1400-PA00002779, INSTA360 1400-PA00002799, INSTA360 1400-PA00002792) (2018) 30 pages.
Instagram Hyperlapse (e.g., INSTA360 1400-PA00002410) Dated Jul. 8, 2024, 10 pages.
Jia, Chao, and Brian L. Evans. "Constrained 3D Rotation Smoothing via Global Manifold Regression for Video Stabilization." IEEE Trans. Signal Processing 62.13 (2014): 3293-3304.
Jim Martin, GoPro Hero Review (2018), Tech Advisor (May 18, 2018), https://www.techadvisor.com/article/719094/gopro-hero-review-2018.html).
Kancharla et al., "Fast and Robust Algorithm for Video Stabilization" 2012. 5 pages.
Karpenko et al., "Digital video stabilization and rolling shutter correction using gyroscopes", Stanford University Computer Science Tech Report CSTR 2011-03, Sep. 2011, https://graphics.stanford.edu/papers/stabilization/, 1 page.
Kejriwal et al., "A Hybrid Filtering Approach of Digital Video Stabilization for UAV using Kalman and Low Pass Filter" Sep. 2016, 9 pages.
Lim et al., "The Alpha-Trimming Mean Filter for Video Stabilization" Dec. 2016, 4 pages.
Liu et al., "A Hybrid Approach for Near-Range Video Stabilization" Sep. 5, 2017, 12 pages.
Liu et al., "Bundled Camera Paths for Video Stabilization" Jul. 2013, 10 pages.
Liu et al., "Content-Preserving Warps for 3D Video Stabilization" Aug. 2009, 9 pages.
Liu et al., "MeshFlow: Minimum Latency Online Video Stabilization" Oct. 2016, 16 pages.
Liu et al., "SteadyFlow: Spatially Smooth Optical Flow for Video Stabilization" Jun. 2014, 8 pages.
Liu et al., "Subspace Video Stabilization" Feb. 2, 2011, 10 pages.
Michael Zhang, ReelSteady Aims to Take Video Stabilization Software to the Next Level, PETAPIXEL (Aug. 27, 2015), https://petapixel.com/2015/08/27/reelsteady-aims-to-take-video-stabilization-software-to-the-next-level/).
Mike McCarthy, Review GoPro Fusion 360 camera, Postperspective (Nov. 30, 2017), https://postperspective.com/review-gopro-fusion-360-camera/ ("McCarthy")).
Nikon D5200 Digital Camera (e.g., INSTA360 1400-PA00001186) 2012, 266 pages.
Rawat et al., "Gaussian Kernel Filtering for Video Stabilization" Oct. 2017, 6 pages.
ReelSteady (e.g., ReelSteady, Version 1.0 out now!, ReelSteady (Apr. 28, 2016), https://www.reelsteady.com/blogs/news/105201414-version-1-0-out-now.
Reelsteady, New version!, ReelSteady (Mar. 7, 2017), https://www.reelsteady.com/blogs/news/tagged/build89.
Ricoh Theta (e.g., INSTA360 1400-PA00000940, INSTA360 1400-PA00000941) Available from internet, URL: https://www.youtube.com/watch?v=cAEih4lp7us 1 page. Dated Oct. 21, 2024.
Sony FDR-X3000 Action Cam (e.g., INSTA360 1400-PA00002522, INSTA360 1400-PA00002506, INSTA360 1400-PA00002514) Dated Jul. 8, 2024, 18 pages.
Souza et al., "Combination of Local Feature Detection Methods for Digital Video Stabilization" May 26, 2018, 9 pages.
Souza et al., "Digital Video Stabilization Based on Adaptive Camera Trajectory Smoothing" May 2018, 11 pages.
ThiEye T5e Action Camera (e.g., INSTA360 1400-PA00002525, INSTA360 1400-PA00002536) 2018, 12 pages.
Ton-Thi et al., "Video Stabilization Algorithm Using a Moving Alpha-Trimmed Mean Filter Window," Jun. 2014, 2 pages.
V. Renee, Meet ReelSteady, a Video Stabilization Plugin That Really Does Its Job, Nofilmschool (Aug. 15, 2015), https://nofilmschool.com/2015/08/meet-reelsteady-video-stabilization-plugin-really-does-its-job.
Wang et al., "Spatially and Temporally Optimized Video Stabilization" Aug. 2013, 8 pages.
Wang et al., "Video Stabilization: a Comprehensive Survey" Oct. 17, 2022. 26 pages.
Wei et al.,"Gyroscope and Visual Fusion Solution for Digital Video Stabilization" (INSTA360 1400-PA00002537) Sep. 2016, 18 pages.
Yi 4K Action Camera (e.g., INSTA360 1400-PA00002555, INSTA360 1400-PA00002557, INSTA360 1400-PA00002380) 2024, 14 pages.
David Fleet et al., Computer Vision—ECCV 2014, 23 pages.
Declaration of Dr. Aggelos Katsaggelos, dated Jul. 12, 2024, 285 pages. *Arashi Vision(U.S.) LLC(D/B/A Insta360)* v. *GoPro, Inc.*, U.S. Pat. No. 10,958,840, Inter Partes Review No. IPR2024-01164.
Declaration of Dr. Aggelos Katsaggelos, dated Jul. 12, 2024, 285 pages. *Arashi Vision(U.S.) LLC(D/B/A Insta360)* v. *GoPro, Inc.*, U.S. Pat. No. 10,958,840, Inter Partes Review No. IPR2024-01165.
Declaration of Dr. Aggelos Katsaggelos, dated Jul. 18, 2024, 252 pages. *Arashi Vision(U.S.) LLC(D/B/A Insta360)* v. *GoPro, Inc.*, U.S. Pat. No. 10,574,894, Inter Partes Review No. 2024-01186.
Declaration of Sylvia D. Hall-Ellis, PH.D., dated Jul. 11, 2024, 91 pages. *Arashi Vision(U.S.) LLC(D/B/A Insta360)* v. *GoPro, Inc.*, U.S. Pat. No. 10,958,840.
Exhibit 16, Exemplary Infringement Claim Chart for U.S. Pat. No. 10,574,894, filed Aug. 22, 2019, 36 pages.
Exhibit 17, Exemplary Infringement Claim Chart for U.S. Pat. No. 10,958,840, filed Dec. 13, 2019, 36 pages.
Mar. 29, 2024 Letter to U.S. International Trade Commission providing Complainant's Initial Statement on the Public Interest, Complaint Under Section 337 of the Tariff Act of 1930, as Amended, 44 pages, RE: Certain Cameras, Camera Systems, and Accessories Used Therewith.
PCT File History for PCT Application No. PCT/US15/38913, Filing Date May 9, 2019, 230 pages.
Petition for Inter Partes Review Under 35 U.S.C. Sections 311-319 and 37 C.F.R. Section 42.100 et seq., dated Jul. 12, 2024, 88 pages. *Arashi Vision(U.S.) LLC(D/B/A Insta360)* v. *GoPro, Inc.*, U.S. Pat. No. 10,958,840, Inter Partes Review No. IPR2024-01165.
Petition for Inter Partes Review Under 35 U.S.C. Sections 311-319 AND 37 C.F.R. Section 42.100 et seq., dated Jul. 12, 2024, 92 pages.*Arashi Vision(U.S.) LLC(D/B/A Insta360)* v. *GoPro, Inc.*, U.S. Pat. No. 10,958,840, Inter Partes Review No. IPR2024-01164.
Petition for Inter Partes Review Under 35 U.S.C. Sections 311-319 and 37 C.F.R. Section 42.100 et seq., dated Jul. 18, 2024, 85 pages. *Arashi Vision(U.S.) LLC(D/B/A Insta360)* v. *GoPro, Inc.*, U.S. Pat. No. 10,574,894, Inter Partes Review No. IPR2024-01186.
Petitioner's Petition Ranking and Explanation of Material Differences Between Petitions, dated Jul. 15, 2024, 7 pages. *Arashi Vision(U.S.) LLC(D/B/A Insta360)* v. *GoPro, Inc.*, U.S. Pat. No. 10,958,840, Inter Partes Review No. IPR2024-01164.
Petitioner's Petition Ranking and Explanation of Material Differences Between Petitions, dated Jul. 15, 2024, 7 pages. *Arashi Vision(U.S.) LLC(D/B/A Insta360)* v. *GoPro, Inc.*, U.S. Pat. No. 10,958,840, Inter Partes Review No. IPR2024-01165.
Petitioner's Power of Attorney Under 37 C.F.R. Section 42.10(b) dated Jun. 20, 2024, 3 pages. *Arashi Vision(U.S.) LLC(D/B/A Insta360)* v. *GoPro, Inc.*, U.S. Pat. No. 10,958,840.

(56) References Cited

OTHER PUBLICATIONS

Petitioner's Power of Attorney Under 37 C.F.R. Section 42.10(b), dated Jun. 20, 2024, 3 pages. *Arashi Vision(U.S.) LLC(D/B/A Insta360)* v. *GoPro, Inc.*, U.S. Pat. No. 10,574,894 B2, , Inter Partes Review No. IPR2024-01186.
Prosecution History of U.S. Pat. No. 10,574,894, Filing Date Aug. 22, 2019, 482 pages.
Steven Bell et al., "A Non-Linear Filter for Gyroscope-Based Video Stabilization", pp. 294-308, 2014.
File History for U.S. Pat. No. 10,958,840, Filing Date Dec. 13, 2019, 205 pages.

* cited by examiner

SYSTEMS AND METHODS FOR STABILIZING VIDEOS

FIELD

This disclosure relates to stabilizing videos using positions of an image capture device during a capture duration.

BACKGROUND

A video may have been captured by an image capture device in motion. The motion of the image capture device during the capture of the video may cause the video to appear jerky/shaky.

SUMMARY

This disclosure relates to stabilizing videos. Visual content having a field of view may be captured by an image capture device during a capture duration. Visual information defining the visual content, position information characterizing rotational positions of the image capture device at different moments within the capture duration, and/or other information may be obtained. A trajectory of the image capture device during the capture duration may be determined based on the position information and/or other information. The trajectory may reflect the rotational positions of the image capture device at different moments within the capture duration. The trajectory may include a first portion corresponding to a first moment within the capture duration and a second portion corresponding to a second moment subsequent to the first moment within the capture duration. A smoothed trajectory of the image capture device may be determined based on a subsequent portion of the trajectory and/or other information such that a portion of the smoothed trajectory corresponding to the first portion of the trajectory may be determined based on the second portion of the trajectory. The smoothed trajectory may have smoother changes in the rotational positions of the image capture device than the trajectory. A viewing window for the visual content may be determined based on the smoothed trajectory of the housing and/or other information. The viewing window may define one or more extents of the visual content. Stabilized visual content of a video may be generated based on the viewing window and/or other information. The stabilized visual content may include a punchout of the extent (s) of the visual content within the viewing window.

A system that stabilizes videos may include one or more electronic storages, one or more processors, and/or other components. An electronic storage may store visual information defining visual content, information relating to visual content, position information characterizing rotational positions of an image capture device, information relating to rotational positions of an image capture device, information relating to a trajectory of an image capture device, information relating to a smoothed trajectory of an image capture device, information relating to a field of view of an optical element, information relating to a viewing window, information relating to stabilized visual content, information relating to a punchout of visual content, and/or other information. In some implementations, the system may include one or more optical elements, one or more image sensors, one or more position sensors, and/or other components.

One or more components of the system may be carried by a housing, such as a housing of an image capture device. For example, the optical element(s), the image sensor(s), and/or the position sensor(s) of the system may be carried by the housing of an image capture device. The housing may carry other components, such as the processor(s) and/or the electronic storage.

An optical element may be configured to guide light within a field of view to an image sensor. The field of view may be larger than a size of the punchout/viewing window used to generate stabilized visual content. An image sensor may be configured to generate a visual output signal based on light that becomes incident thereon during a capture duration. The visual output signal may convey visual information that defines visual content having the field of view.

A position sensor may be configured to generate a position output signal based on positions of the housing during the capture duration. The position output signal may convey position information that characterizes rotational positions of the housing at different moments within the capture duration. In some implementations, the position information may further characterize translational positions of the housing at different moments within the capture duration. In some implementations, the position sensor may include one or more of a gyroscope, an accelerometer, and/or an inertial measurement unit. The position information may be determined independent of the visual information.

The processor(s) may be configured by machine-readable instructions. Executing the machine-readable instructions may cause the processor(s) to facilitate stabilizing videos. The machine-readable instructions may include one or more computer program components. The computer program components may include one or more of a trajectory component, a smoothed trajectory component, a viewing window component, a generation component, and/or other computer program components.

The trajectory component may be configured to determine a trajectory of the housing during the capture duration based on the position information and/or other information. The trajectory may reflect rotational positions of the housing at different moments within the capture duration. In some implementations, the trajectory may further reflect translational positions of the housing at different moments within the capture duration. The trajectory may include a first portion corresponding to a first moment within the capture duration and a second portion corresponding to a second moment subsequent to the first moment within the capture duration.

The smoothed trajectory component may be configured to determine a smoothed trajectory of the housing based on a subsequent portion of the trajectory and/or other information. The smoothed trajectory may be determined such that a portion of the smoothed trajectory corresponding to the first portion of the trajectory is determined based on the second portion of the trajectory. The smoothed trajectory may have smoother changes in the rotational positions of the housing than the trajectory. In some implementations, the smoothed trajectory may have smoother changes in the translational positions of the housing than the trajectory.

In some implementations, the smoothed trajectory having smoother changes in the rotational positions of the housing than the trajectory may be characterized by the smoothed trajectory having less jitters in the rotational positions of the housing than the trajectory. In some implementations, the smoothed trajectory having smoother changes in the translational positions of the housing than the trajectory may be characterized by the smoothed trajectory having less jitters in the translational positions of the housing than the trajectory.

In some implementations, the smoothed trajectory having smoother changes in the rotational positions of the housing than the trajectory may include high frequency changes in the rotational positions of the housing in the trajectory being removed from the smoothed trajectory. In some implementations, the smoothed trajectory having smoother changes in the translational positions of the housing than the trajectory may include high frequency changes in the translational positions of the housing in the trajectory being removed from the smoothed trajectory.

In some implementations, an extent to which the smoothed trajectory of the housing deviates from the trajectory of the housing may depend on an amount of rotational motion and/or translational motion experienced by the housing during the capture duration, an exposure time with which the visual content is captured, and/or other information.

In some implementations, the determination of the smoothed trajectory of the housing based on the subsequent portion of the trajectory may include: (1) obtaining a rotational position of the housing at the first moment within the capture duration, the first moment being a point in time and corresponding to a video frame of the visual content captured at the point in time within the capture duration; (2) obtaining rotational positions of the housing at the second moment within the capture duration, the second moment being a duration of time subsequent to the point in time within the capture duration; and (3) determining a corresponding rotational position of the housing within the smoothed trajectory at the first moment based on the rotational position of the housing at the point in time, the rotational positions of the housing during the duration of time subsequent to the point in time, and/or other information. Placement of the viewing window for the visual content with respect to the field of view of the visual content captured at the first moment may be determined based on the corresponding rotational position of the housing within the smoothed trajectory at the first moment and/or other information.

In some implementations, the determination of the smoothed trajectory of the housing based on the subsequent portion of the trajectory may further include: (1) determining whether the placement of the viewing window for the visual content at the first moment results in one or more portions of the viewing window exceeding the field of view of the visual content; and (2) responsive to a determination that the portion(s) of the viewing window for the visual content at the first moment exceeds the field of view of the visual content, adjusting the corresponding rotational position of the housing within the smoothed trajectory at the first moment such that the viewing window for the visual content at the first moment does not exceed the field of view of the visual content.

In some implementations, the corresponding rotational position of the housing within the smoothed trajectory at the first moment may be initially determined based on a combination of the rotational position of the housing at the first moment and an estimate of the corresponding rotational position of the housing, and/or other information. The estimate of the corresponding rotational position of the housing may be determined based on minimization of a combination of a rotational velocity of the housing and a rotational acceleration of the housing, and/or other information.

The viewing window component may be configured to determine a viewing window for the visual content based on the smoothed trajectory of the housing and/or other information. The viewing window may define one or more extents of the visual content.

The generation component may be configured to generate stabilized visual content of a video based on the viewing window and/or other information. The stabilized visual content may include a punchout of the extent(s) of the visual content within the viewing window.

In some implementations, at least one of the processor(s) may be a remote processor located remotely from the housing of the image capture device. Generation of the stabilized visual content may be performed by the remote processor post capture of the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
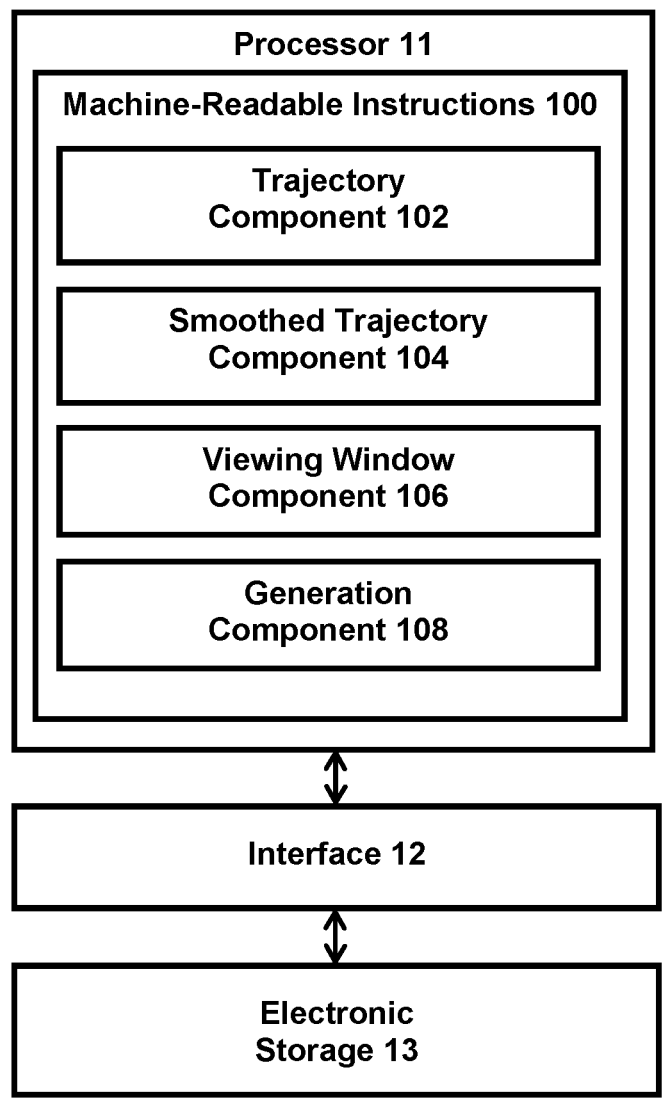
FIG. 1 illustrates an example system that stabilizes videos.

FIG. 1 illustrates a system 10 for stabilizing videos. The system 10 may include one or more of a processor 11, an interface 12 (e.g., bus, wireless interface), an electronic storage 13, and/or other components. In some implementations, the system 10 may include one or more image sensors, one or more position sensors, and/or other components. Visual content having a field of view may be captured by an image capture device during a capture duration. Visual information defining the visual content, position information characterizing rotational positions of the image capture device at different moments within the capture duration, and/or other information may be obtained. Visual information, position information, and/or other information may be obtained by the processor 11. A trajectory of the image capture device during the capture duration may be determined based on the position information and/or other information. The trajectory may reflect the rotational positions of the image capture device at different moments within the capture duration. The trajectory may include a first portion corresponding to a first moment within the capture duration and a second portion corresponding to a second moment subsequent to the first moment within the capture duration. A smoothed trajectory of the image capture device may be determined based on a subsequent portion of the trajectory and/or other information such that a portion of the smoothed trajectory corresponding to the first portion of the trajectory may be determined based on the second portion of the trajectory. The smoothed trajectory may have smoother changes in the rotational positions of the image capture device than the trajectory. A viewing window for the visual content may be determined based on the smoothed trajectory of the housing and/or other information. The viewing window may define one or more extents of the visual content. Stabilized visual content of a video may be generated based on the viewing window and/or other information. The stabilized visual content may include a punchout of the extent(s) of the visual content within the viewing window.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to visual content, visual content information defining visual content, information relating to image capture device, information relating to optical element, information relating to image sensor, information relating to position sensor, position information characterizing rotational positions of the image capture device, information relating to rotational positions of the image capture device, information relating to trajectory of the image capture device, information relating to smoothed trajectory of the image capture device, information relating to field of view of an optical element, information relating to a viewing window, information relating to stabilized visual content, information relating to a punchout of visual content, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a trajectory component 102, a smoothed trajectory component 104, a viewing window component 106, a generation component 108, and/or other computer program components.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, image sensor(s) and position sensor(s) of the system 10 may be carried by the housing of the image capture device. The housing may carry other components, such as the processor 11, the electronic storage 13, and/or one or more optical elements. References to a housing of an image capture device may refer to the image capture device, and vice versa. For example, references to position/motion of a housing of an image capture device may refer to position/motion of the image capture device, and vice versa.

Figure 3:
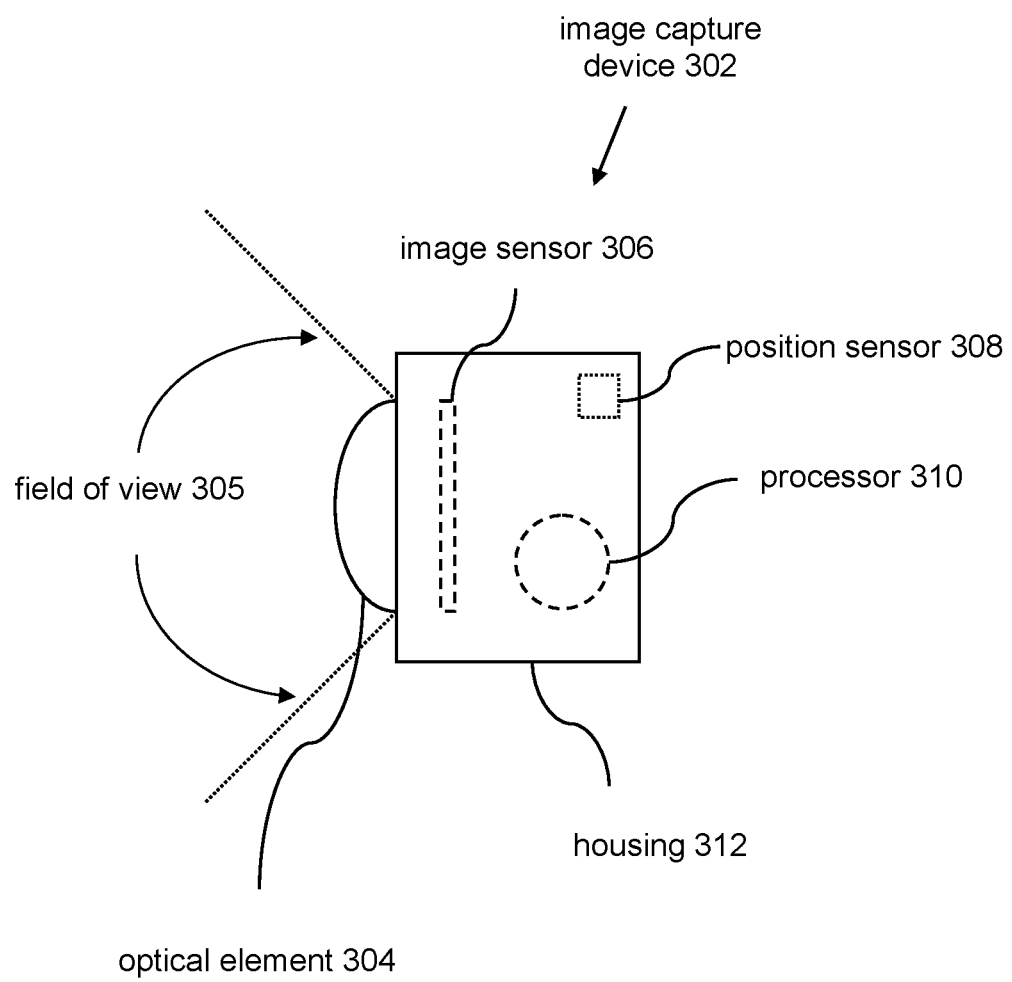
FIG. 3 illustrates an example image capture device.

An image capture device may refer to a device for recording visual information in the form of images, videos, and/or other media. An image capture device may be a standalone device (e.g., camera) or may be part of another device (e.g., part of a smartphone). FIG. 3 illustrates an example image capture device 302. The image capture device 302 may include a housing 312, and the housing 312 may carry (be attached to, support, hold, and/or otherwise carry) an optical element 304, an image sensor 306, a position sensor 308, a processor 310, and/or other components. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The field of view 305 may be larger than a size of the punchout/viewing window used to generate stabilized visual content. Portions of the visual content captured from light within the field of view 305 may be presented on a display and/or used to generate a video. The portions of the visual content presented on the display/used to generate a video may include those portions of the visual content within a viewing window. A viewing window may define extents of the visual content (e.g., of image(s)/video frame(s)) to be included within a punchout. The viewing window may be determined so that the visual content within the presentation/generated video does not appear shaky/jerky or appears less shaky/jerky. For example, the shape, size, and/or the location of the viewing window within the visual content may be determined to compensate for motion of the image capture device 302 during capture such that the video appears to have been captured from an image capture device 302 with less motion. That is, the visual content captured by the image capture device 302 may be cropped to generate stabilized visual content.

The image sensor 306 may include sensor(s) that converts received light into output signals. The output signals may include electrical signals. For example, the image sensor 306 may include one or more of a charge-coupled device sensor, an active pixel sensor, a complementary metal-oxide semiconductor sensor, an N-type metal-oxide-semiconductor sensor, and/or other image sensors. The image sensor 306 may generate output signals conveying information that defines visual content of one or more images and/or one or more video frames of a video. For example, the image sensor 306 may be configured to generate a visual output signal based on light that becomes incident thereon during a capture duration. The visual output signal may convey visual information that defines visual content having the field of view.

The position sensor 308 may include sensor(s) that measures experienced positions and/or motions. The position sensor 308 may convert experienced positions and/or motions into output signals. The output signals may include electrical signals. For example, the position sensor 308 may refer to a set of position sensors, which may include one or more inertial measurement units, one or more accelerometers, one or more gyroscopes, and/or other position sensors. The position sensor 308 may generate output signals conveying information that characterizes positions and/or motions of the position sensor 308 and/or device(s) carrying the position sensor 308, such as the image capture device 302 and/or the housing 312.

For example, the position sensor 308 may be configured to generate a position output signal based on positions of the housing/image capture device during the capture duration. The position output signal may convey position information that characterizes positions of the housing 312 at different moments (points in time, time durations) within the capture duration. The position information may characterize positions of the housing 312 based on specific translational and/or rotational positions of the housing 312 and/or based on changes in translational and/or rotational positions of the housing 312 as a function of progress through the capture duration. That is, the position information may characterize translational and/or rotational positions of the housing 312 and/or changes in translational and/or rotational positions (motion) of the housing 312 (e.g., direction, amount, velocity, acceleration) during the capture duration.

The position information may be determined based on signals generated by the position sensor 308 and independent of the information/signals generated by the image sensor 306. That is, position information may be determined without using visual content/images/videos generated by the image sensor 306. Use of visual content/images/videos to determine positions/motions of the housing 312/image capture device 302 may be computationally expensive in terms of processing power, processing time, and/or battery consumption. Using the information/signals from the position sensor 308 to determine positions/motions of the housing 312/image capture device 302 may be computationally cheaper. That is, less processing power, processing time, and/or battery consumption may be required when positions/motions of the housing 312/image capture device 302 are determined from the information/signals from the position sensor 308 than the information/signals from the image sensor 306. The position information determined independent of the image information may be used to determine the trajectory of the housing 312/image capture device 302 during the capture duration.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or the position sensor 308, and/or facilitate transfer of information from the image sensor 306 and/or the position sensor 308 to another device/component. The processor 310 may be remote from the processor 11 or local to the processor 11. One or more portions of the processor 310 may be part of the processor 11 and/or one or more portions of the processor 10 may be part of the processor 310. The processor 310 may include and/or perform one or more functionalities of the processor 11 shown in FIG. 1.

For example, the processor 310 may use the position information to stabilize visual content captured through the optical element 304 and/or the image sensor 306. Visual content may be captured by the image capture device 302 during a capture duration. The trajectory (path, progression) of rotational and/or translational positions experienced by the image capture device 302 during the capture duration may be determined based on the position information and/or other information. A smoothed trajectory of the image capture device 302 may be determined based on a look-ahead of the trajectory and/or other information. A look-ahead of the trajectory may include use of a subsequent portion of the trajectory to determine a preceding portion of the smoothed trajectory. For example, a portion of the smoothed trajectory corresponding to a point or a duration within the capture duration may be determined based on a portion of the trajectory corresponding to a future point/duration ahead of the point/duration within the capture duration. For instance, a portion of the smoothed trajectory corresponding to a point (a video frame) within the capture duration may be determined based on a portion of the trajectory corresponding to a one-second duration subsequent to/ahead of the point within the capture duration.

The smoothed trajectory may be used to determine a viewing window for stabilization of the visual content. The viewing window may define the extent(s) of the visual content that is to be punched-out to stabilize the visual content. The stabilized visual content may include cropped extents of the visual content, with the viewing window defining the extents of the visual content that is cropped out. The extent to which the viewing window may be moved within the visual content may be referred to as stabilization margin. The stabilization margin may specify how much the crop may move while remaining wholly within the field of view of the visual content.

Such stabilization of visual content may preserve intentional motion experienced by the image capture device 302 during the capture duration. Intentional motion may refer to the motion that was intended by the user of the image capture device 302. Intentional motion may include meaningful phenomenon related to video semantics, which may express what the user actually wanted to capture. For example, intentional motion may include a forward motion to follow an object of interest, a panning motion to shoot a wide view of a scenery, and/or other motion. Unintentional may refer to motion that was not intended by the user of the image capture device 304. Unintentional motion may result in noise within the captured visual content, such as motion of the visual content due unintended motion of the image capture device 304 (e.g., caused by shaking hands, vibrations, bumps).

Intentional motion may be characterized by lower frequency motion than unintentional motion. Unintentional motion may be characterized by higher frequency motion (e.g., jitter, shake) than intentional motion. To identify intentional motion, which is characterized by low frequencies, a sufficiently long temporal horizon of experienced motion may need to be used. Thus, to stabilize visual content, a subsequent portion of the trajectory is used to determine the smoothed trajectory. Longer intervals of the temporal horizon may enable better approximation of the intentional motion while causing longer delays (longer wait to determine smoothed trajectory).

The smoothed trajectory (crop trajectory) may be determined based on minimization of a value, a score, and/or a metric that expresses the amount of high frequencies. The value/score/metric may be determined based on an objective function that consists of groups of terms. For example, the objective function may include two groups of terms, where one term expresses the L2-norm of interframe angular velocity and the other term expresses the angular acceleration. One or more of the terms may be weighted by one or more constant. The constants may determine the amount of contribution of individual terms to the objective function. From signal processing perspective, the two terms may correspond to output power of two high-pass filters.

The values of the smoothed trajectory over the capture duration may include values that minimize the value/score/metric expressing the amount of high frequencies while respecting a crop constraint. The crop constraint may require the viewing window for punchout of the visual content to remain within the field of view of the visual content. The viewing window (determined based on the smoothed trajectory) may not extend beyond the captured extents of the visual content.

In some implementations, iterative minimization may be used to determine the smoothed trajectory. The iterative minimization may include iterations of two steps that alters the latest estimate: (1) an update step that updates the current estimate regardless of any constraint(s) in a way that the value of the objection function decreases; and (2) a projection step that applies the constraint(s)—the current estimate is tested on whether the constraint(s) are satisfied (e.g., whether the viewing window for punchout of the visual content remains within the field of view of the visual content), and the current estimate is re-projected if the constraint(s) are not satisfied (e.g., the viewing window extends beyond the field of view of the visual content).

The stabilization of the visual content may include use of a trajectory retrieval algorithm and a stabilization algorithm. The input to the trajectory retrieval algorithm may include the trajectory experienced by the image capture device 302 (e.g., rotational positions when capturing video frames), a bootstrap trajectory, a fixed past, number(s) of iterations to be performed, and/or other information. The output of the trajectory retrieval algorithm may include the smoothed trajectory (e.g., virtual/actual rotational positions to be used to determine punchouts of the video frames) and/or other information.

The trajectory retrieval algorithm may include one or more of the following steps. The projection may be prepared by copying the input trajectory into a projection buffer. Bootstrap may be obtained and padded if it is shorter than a given length. The bootstrap may be used as the current/initial guess of the smoothed trajectory. If there is no fixed past, the bootstrap may be extrapolated on the left using the first sample. Otherwise, the bootstrap may be extrapolated on the right using the last sample. The trajectory may be smoothed using an iterative approach. The trajectory may be smoothed using a fine scale approach and a coarse approach. For example, the trajectory may be smoothed using a fine scale approach to smooth the trajectory on a small scale, and then the smoothed trajectory may be checked to determine whether the crop constraint is satisfied. If the crop constraint is not satisfied, projection may be performed, and the smoothing of the trajectory may be changed so that the crop constraint is satisfied. The fine scale smoothing may be iterated a number of times, and after the iterations of the fine scale smoothing, the current guess as to the smoothed trajectory may be subsampled. Then the trajectory may be smoothed using a coarse scale approach to smooth the trajectory on a larger scale. The coarse scale smoothing may be iterated a number of times, and after the iterations of the coarse scale smoothing, the subsampled current guess as to the smoothed trajectory may be upsampled. Then the trajectory may be smoothed again using a fine scale approach. The iterative smoothing of the trajectory may result in convergence of the smoothed trajectory. After a number of iterations, subsequent iterations may have smaller impact on smoothing of the trajectory. Once the iterations of the fine scale and coarse scale smoothing has been completed, the current guess may be outputted.

The input to the stabilization algorithm may include visual content (video stream, video frames and their timestamps (e.g., moment when center scanline is captured)) captured by the image capture device 302, position information (e.g., gyroscope stream, packets of gyroscope samples), and/or other information. The output of the stabilization algorithm may include stabilized visual content, viewing window for the punchout of the visual content (e.g., stabilized crop orientation in time), and/or other information.

The stabilization algorithm may include one or more of the following steps for individual video frames to be stabilized. Gyroscope samples may be integrated to reach the frame timestamp. The frame may be inserted into a circular buffer. When a sufficient number of frames are in the buffer (e.g., a number of frames in the buffer being same as and/or larger than a threshold number), the input trajectory may be unwrapped. The fixed past may be prepared by obtaining the crop orientation history and unwrapping it backwards with respect to the first ample of the input trajectory. If there is not history, the fixed past may be considered to be empty. The bootstrap may be prepared by taking the crop orientation history and filling the rest with input samples according to their timestamps. If there is no history, the bootstrap may be considered equal to the input trajectory. The trajectory retrieval algorithm may be invoked/performed. The smoothed trajectory outputted by the trajectory retrieval algorithm may be stored in the orientation history. The frames in the head of the buffer may be warped based on the smoothed trajectory by computing the rotation corresponding to pass from the source orientation to the stabilized orientation. The crop field of view may be sampled to take a grid of points, and the grid may be rotated. The grid may be projected onto the source camera image plane and warped. The warped image may be encoded.

Referring back to FIG. 1, the processor 11 (or one or more components of the processor 11) may be configured to obtain information to facilitate stabilizing videos. Obtaining information may include one or more of accessing, acquiring, analyzing, determining, examining, identifying, loading, locating, opening, receiving, retrieving, reviewing, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a position sensor) and/or one or more software components (e.g., software running on a computing device).

For example, the processor 11 (or one or more components of the processor 11) may obtain visual information defining visual content having a field of view, position information characterizing positions of an image capture device at different moments within a capture duration, and/or other information. One or more information may be obtained during acquisition of the visual content and/or after acquisition of the visual content by an image capture device. For example, visual information, position information, and/or other information may be obtained while the visual content are being captured by an image capture device and/or after the visual content have been captured and stored in memory (e.g., the electronic storage 13).

The trajectory component 102 may be configured to determine a trajectory of the image capture device/housing of the image capture device during the capture duration based on the position information and/or other information. The determination of the trajectory may be referred to as trajectory generation. The trajectory generated by the trajectory component 102 may include the trajectory of the image capture device/housing of the image capture observed by one or more positions sensors. The (observed) trajectory may refer to one or more paths and/or progression of positions followed/experienced by the image capture device/housing during the capture duration. The (observed) trajectory may reflect positions of the image capture device/housing of the image capture device at different moments within the capture duration. The positions of the image capture device/housing of the image capture device may include rotational positions (e.g., rotations about one or more axis of the image capture device) and/or translational positions of the image capture device/housing of the image capture device. For example, the trajectory component 102 may determine a trajectory of the image capture device/housing of the image capture device during the capture duration based on the position information characterizing specific translational and/or rotational positions of the image capture device/housing and/or changes in translational and/or rotational positions of the image capture device/housing as a function of progress through the capture duration.

The (observed) trajectory may include different portions corresponding to different moments within the capture duration. For example, the (observed) trajectory may include a first portion corresponding to a first moment within the capture duration and a second portion corresponding to a second moment within the capture duration. The second moment may be subsequent to the first moment within the capture duration.

Figure 4:
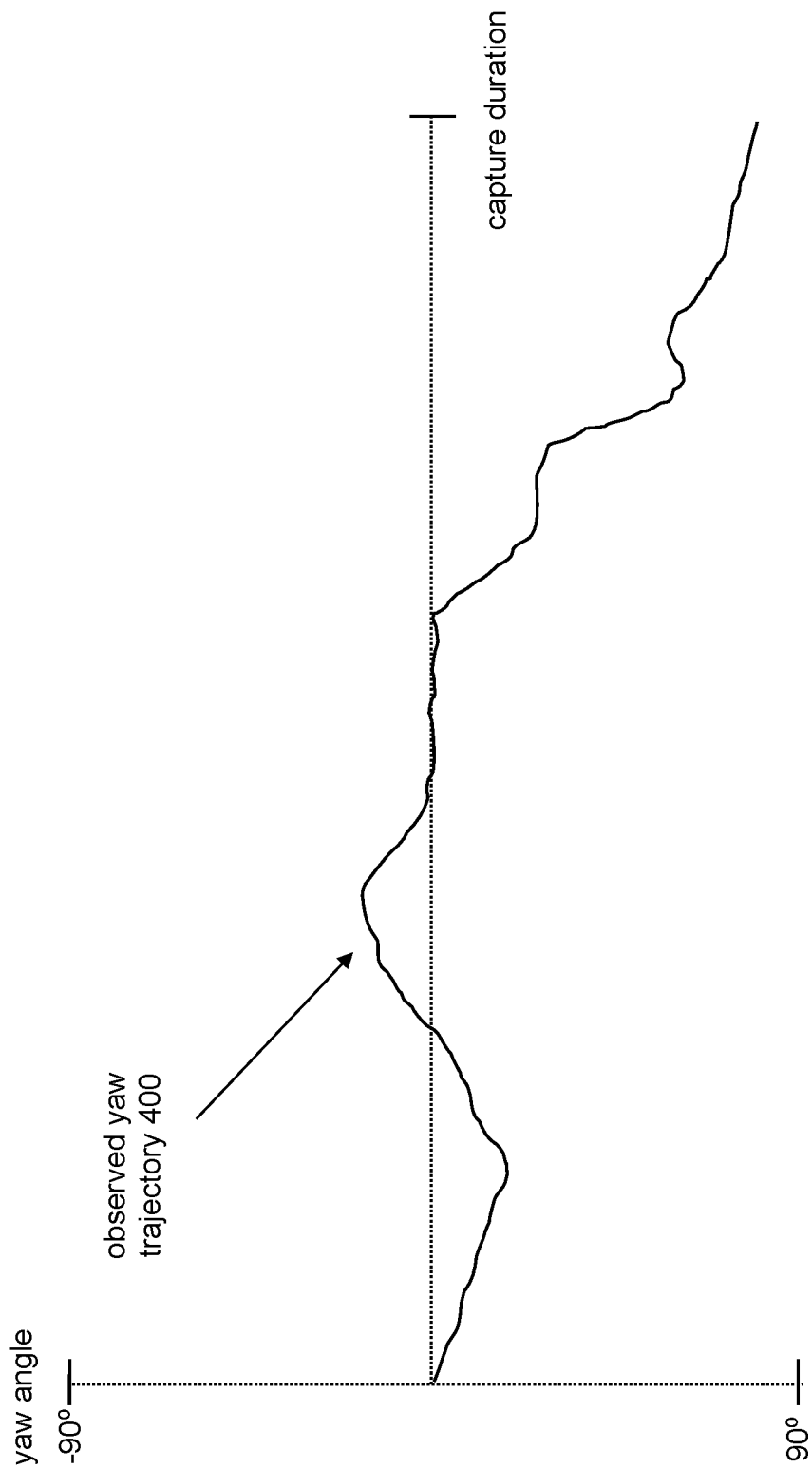
FIG. 4 illustrates an example trajectory of rotational positions of an image capture device within a capture duration.

FIG. 4 illustrates an example trajectory of an image capture device observed by position sensor(s). The trajectory may include an observed yaw trajectory 400 of the image capture device. The observed yaw trajectory 400 may reflect yaw angle positions (e.g., rotational positions defined with respect to a yaw axis, rotation to the left or right) of the image capture device/housing of the image capture device at different moments within the capture duration. The observed yaw trajectory 400 may show that the image capture device was rotated in a negative yaw direction, rotated in a positive yaw direction, rotated back in the forward configuration, then rotated in the negative yaw direction. For example, the image capture device, during capture of images, may have been rotated to the right, then to the left, to the front, then to the right. Other types of trajectory (e.g., pitch trajectory, roll trajectory, translational trajectory) are contemplated.

Generating a video including visual content (e.g., of image(s), of video frame(s), of video(s)) captured along the observed yaw trajectory 400 may be undesirable. For example, generating a video by outputting the images captured along the observed yaw trajectory 400 may result in a video with footage that is shaky and/or that appears to include unintended camera motion. For instance, sharp/quick changes in the yaw angle positions of the image capture device may result in abrupt changes in the direction of visuals within the video (e.g., quick left or right camera motion). Multiple changes in the yaw angle positions of the image capture device may result in a footage that is changing the direction of view (e.g., to the right, to the left, to the front, to the right).

Stabilized visual content may be generated to provide a smoother view of the captured visual content. Stabilization may include using smaller portions/extents of the visual content to provide a punchout view of the visual content that creates a more stable view than when viewing the entirety of the visual content. Generation of stabilized visual content may include using smaller visual portions of the captured visual content (e.g., smaller visual portions of images/video frames) to provide a punchout view of the captured visual content. The stabilized visual content may provide a more stable view of the captured visual content than when the entirety of the captured visual content is presented. For example, such stabilization may be provided by creating a stabilized (smoothed) trajectory over the capture duration and determining the punchouts from the visual content based on the stabilized trajectory. A punchout of visual content may refer to using one or more portions of the visual content for presentation, such as a cut-out of the image or a cropped portion of the image. A punchout of visual content may include one or more portions of the visual content presented on a display and/or one or more portions of the visual content used to generate video frames of video content. However, some stabilization techniques may not preserve the intent of the user that captured the images.

For example, videos may be stabilized by predicting positions/motions of the camera based on past positions/motions. For example, when attempting to determine the location and/or shape of the punchout for an image captured at a given moment within the capture duration, the positions/motions of the image capture device preceding that moment may be used to determine how to position/shape the punchout to create a stabilized view. Such use of "past" position/motion information may conflict with the motion intended by the user of the image capture device.

Figure 5A:
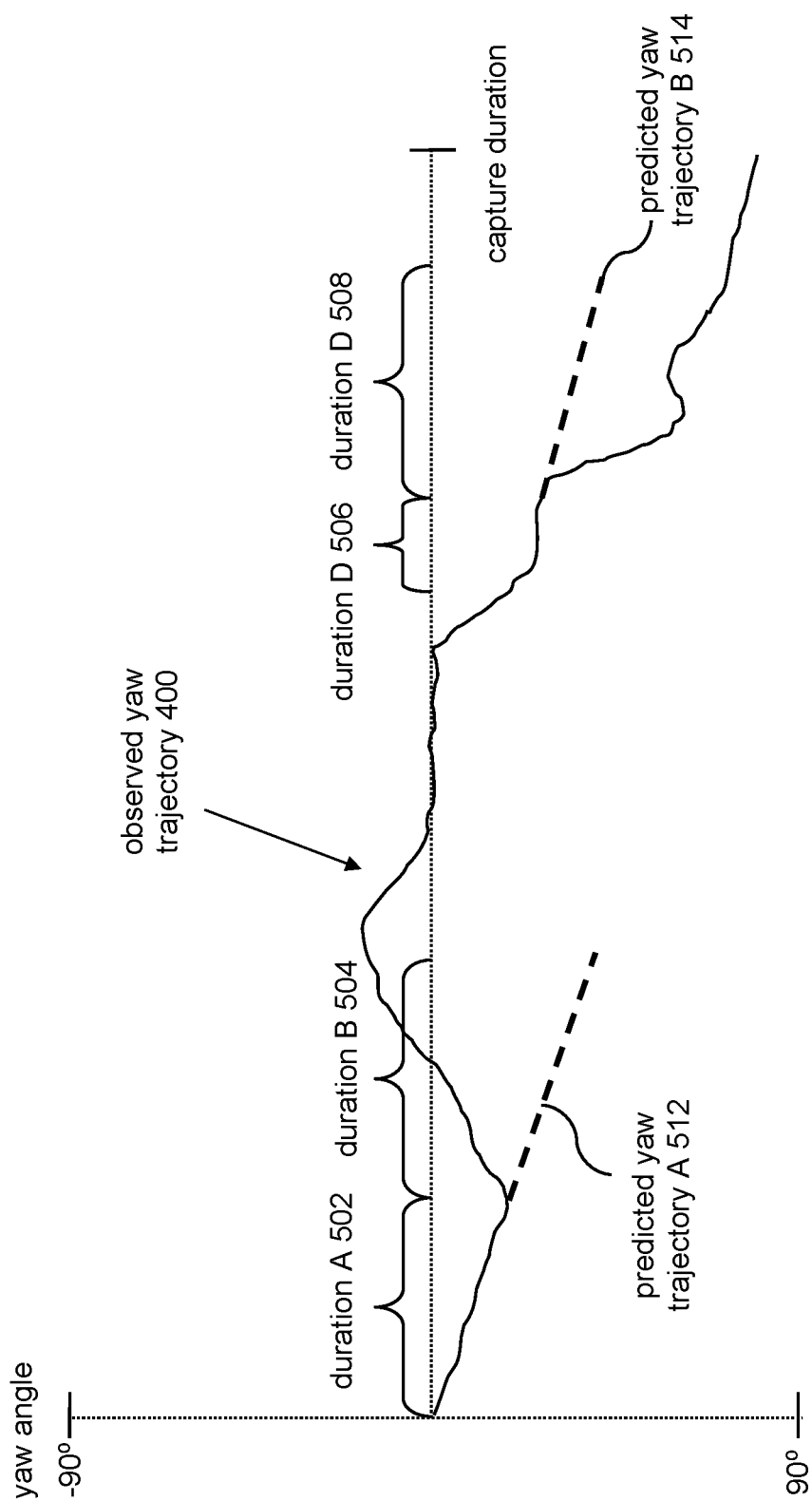
FIG. 5A illustrates example predicted trajectories.

For example, in the observed yaw trajectory 400, the rotation of the image capture device to the right, then to the left, and then to the front may be the result of the image capture device being unintentionally rotated to the right, the user overcorrecting the rotation to the left, and then rotating the image capture device to the right to a front-facing direction. Determining punchout of the images using "past" position/motion information may result in a predicted trajectory as shown in FIG. 5A.

For example, based on the rotation of the image capture device to the right during duration A 502, a predicted yaw trajectory A 512, which continues the rotation to the right, may be predicted for duration B 504. Based on smaller rotation of the image capture device to the right during duration D 506, a predicted yaw trajectory B 514, which continues the smaller rotation to the right, may be predicted for duration D 508. The predicted yaw trajectory A 512 may be in opposite direction of the actual motion of the image capture device during duration B 504, and the predicted yaw trajectory B 514 may be off from the observed yaw trajectory by a large margin. Such discrepancy between the observed yaw trajectory and the predicted yaw trajectory may result in the images not including enough visual information (e.g., pixels) to account for the attempted stabilized and/or the punchout location/shape.

As another example, videos may be stabilized by filtering the observed changes in positions/motions of the image capture device. For instance, a low-pass filter may be applied to the (observed) trajectory to remove abrupt rotational and/or translational changes in the positions/motions of the image capture device.

Figure 5B:
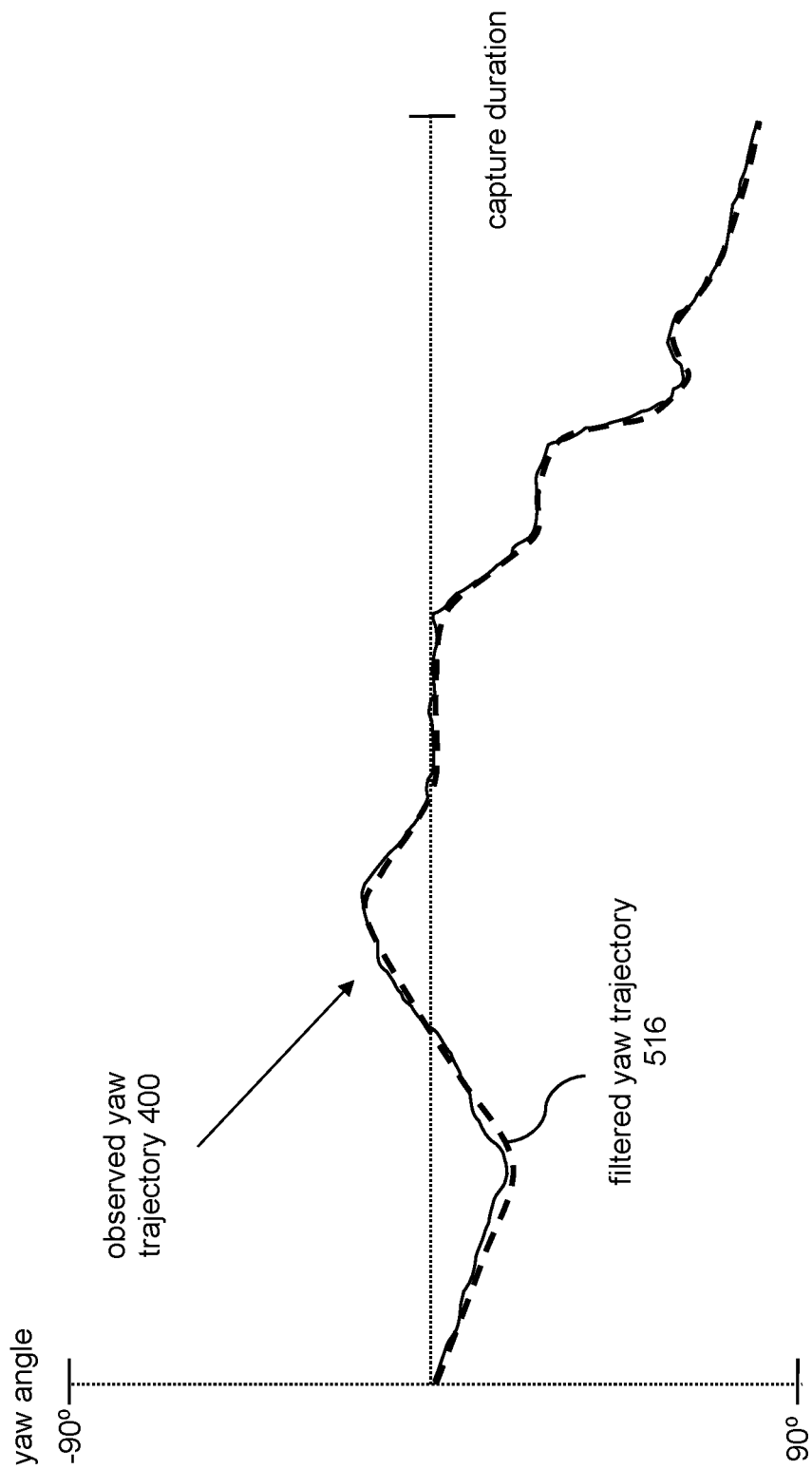
FIG. 5B illustrates an example filtered trajectory.

For example, as shown in FIG. 5B, by applying a low-pass filter to the observed yaw trajectory 400, a filtered yaw trajectory 516 may be determined. The filtered yaw trajectory 516 may have smoother changes in the positions/motions of the image capture device than the observed yaw trajectory. However, such filtering may not take into account how the positions/motions changes during the capture duration and may not preserve the intent of the user that captured the images. For example, even though a video generated from the filtered yaw trajectory 516 may not include abrupt changes in the direction of visuals within the video, the video may still include footage that is changing the direction of view to the right, then to left, to the front, and then to the right in a non-continuous motion (e.g., rotating to the right to a certain angle, holding that position for a time, then rotating to the right, then back a little to the left, and then to the right again).

The smoothed trajectory component 104 may be configured to determine a smoothed trajectory of the image capture device/housing of the image capture device based on one or more subsequent portions of the trajectory and/or other information. The determination of the smoothed trajectory may be referred to as smoothed trajectory generation. The smoothed trajectory may refer to one or more paths and/or progression of positions (e.g., rotational positions, translational position) to be used in determining which portions of the visual content (punchouts) may be used to generate a video. The smoothed trajectory may be used to determine the viewing window from which punchouts of the visual content are generated. The placement of the viewing window within the visual content (e.g., the orientation of the viewing window with respect to the field of view of the visual content, the shape of the viewing window, the size of the viewing window) may be determined based on the smoothed trajectory.

The smoothed trajectory may reflect actual and/or virtual positions of the image capture device/housing of the image capture device at different moments within the capture duration. An actual position may refer to a position that was taken by the image capture device/housing of the image capture. A virtual position may refer to a position that was not taken by the image capture device/housing of the image capture. A virtual position may be offset (rotationally and/or translationally) from the actual position of the image capture device/housing of the image capture device.

The smoothed trajectory may have smoother changes in the positions (rotational positions, translational positions) of the image capture device/housing of the image capture device than the (observed) trajectory of the image capture device/housing of the image capture device. That is, the smoothed trajectory may have less jitters (slight irregular movement/variation), less abrupt changes, and/or less discontinuous changes in the positions (rotational positions, translational positions) of the image capture device/housing of the image capture device than the (observed) trajectory of the image capture device/housing of the image capture device. The smoothed trajectory having smoother changes in positions of the image capture device/housing of the image capture device than the trajectory may include high frequency changes in the positions (rotational positions, translational positions) of the image capture device/housing of the image capture device in the trajectory being removed from the smoothed trajectory. That is, the smoothed trajectory may not include and/or may have fewer high frequencies changes in rotational and/or translational positions of the housing than the (observed) trajectory.

Determining a smoothed trajectory (smoothed trajectory generation) based on a subsequent portion of an (observed trajectory) may include determining a portion of the smoothed trajectory corresponding to a given moment within the capture duration based on one or more portions of the (observed) trajectory corresponding to one or more subsequent moments (future moment(s) of the given moment) within the capture duration. That is, the smoothed trajectory component 104 may "look ahead" in time (look ahead of the given moment) to determine a portion of the capture trajectory. A look ahead may include use of one or more subsequent portions of an (observed) trajectory to determine a preceding portion of the smoothed trajectory. Such generation of smoothed trajectory may be referred to as a look head trajectory generation. A subsequent moment within the duration may be adjacent to the given moment or not adjacent to the given moment. Using the subsequent portion(s) of the (observed) trajectory may enable the smoothed trajectory component 104 to determine a smoothed trajectory that preserves a user's intended motion for the image capture device. The user's intended motion may refer to the motion of the image capture device that the user planned/meant to carry out.

To determine the smoothed trajectory based on a look ahead of the (observed) trajectory, a subsequent portion of the (observed) trajectory may be used to determine a preceding portion of the smoothed trajectory such that a portion of the smoothed trajectory corresponding to a portion of the (observed) trajectory, which corresponds to a moment within the capture duration, is determined based on a later portion of the (observed) trajectory, which corresponds to a later moment within the capture duration.

The positions/motions of the image capture device in the "future" may be analyzed (look ahead) to determine whether particular position(s)/motion(s) of the image capture device at a moment is an intended motion or an unintended motion (e.g., shaking due to vibration, rotation due to bumping/mishandling the image capture device). For example, when determining the smoothed trajectory for a moment (e.g., corresponding to the 1000th video frame) within the capture duration, the position(s)/motion(s) of the image capture device for a duration subsequent to the moment (e.g., corresponding to the next 30 video frames, corresponding to next second of capture) may be analyzed to determine whether the position/motion of the image capture device at the moment was intended or not.

For example, to determine the smoothed trajectory based on the subsequent portion of the (observed) trajectory, a rotational position of the image capture device/housing at a given moment within the capture duration may be obtained. The given moment may be a point in time within the capture duration and may correspond to a video frame of the visual content captured at the point in time within the capture duration. Rotational positions of the image capture device/housing at a later moment within the capture duration may be obtained. The later moment may be a duration of time subsequent to the point in time within the capture duration. A corresponding rotational position of the image capture device/housing within the smoothed trajectory at the given moment may be determined based on the rotational position of the image capture device/housing at the point in time, the rotational positions of the image capture device/housing during the duration of time subsequent to the point in time, and/or other information. Placement of the viewing window for the visual content with respect to the field of view of the visual content captured at the given moment may be determined based on the corresponding rotational position of the image capture device/housing within the smoothed trajectory at the given moment and/or other information.

In some implementations, the determination of the smoothed trajectory of based on the subsequent portion of the (observed) trajectory may further include a check on whether the determined smoothed trajectory results in the corresponding viewing window for the punchout of the visual content remaining within the field of view of the visual content or extending beyond the field of view of the visual content. (whether the placement of the viewing window satisfies or violates a margin constraint). For example, it may be determined whether the placement of the viewing window for the visual content at the given moment results in one or more portions of the viewing window exceeding the field of view of the visual content. Responsive to a determination that the portion(s) of the viewing window for the visual content at the given moment exceeds the field of view of the visual content, the corresponding rotational position of the image capture device/housing within the smoothed trajectory at the given moment may be adjusted. That is, the smoothed trajectory may be adjusted so that the viewing window for the visual content at the given moment does not exceed the field of view of the visual content (the placement of the viewing window satisfies the margin constraint).

In some implementations, the corresponding position (e.g., rotational position, translational position) of the image capture device/housing within the smoothed trajectory at the given moment may be initially determined based on a combination of the position of the image capture device/housing at the given moment and an estimate of the corresponding position of the image capture device/housing, and/or other information. Such initial determination of the positions within the smoothed trajectory may be referred to as bootstrapping.

For example, an optimal estimate of the rotational position of the image capture device/housing within the smoothed trajectory at the given moment may be determined based on minimization of a combination of a rotational velocity of the image capture device/housing and a rotational acceleration of the image capture device/housing, and/or other information. The optimal estimate of the rotational position that minimizes motion (combination of velocity and acceleration) may result in placement of the viewing window for the punchout of the visual content that does not satisfy the margin constraint. Thus, the initial rotational position at the given moment within the smoothed trajectory may be determined by combining the rotational position of the image capture device/housing at the given moment and the optimal estimate of the rotational position within the smoothed trajectory. Combination of the rotational position with the optical estimate of the rotational position may include an average of the two rotational positions. The average of the two rotational positions may weigh the two rotational positions equally or differently.

In some implementations, the smoothed trajectory component 104 may determine a smoothed trajectory of the image capture device/housing of the image capture device further based on one or more prior portions of the (observed) trajectory. The past position/motion information of the image capture device may supply context for the intended motion. The past position/motion of the image capture may be weighted less than the future position/motion of the image capture device in determining the smoothed trajectory. The prior portion(s) of the (observed) trajectory may have less impact on the determination of the smoothed trajectory than the future portion(s) of the (observed) trajectory. The amount of the prior portions of the (observed) trajectory used to determine the smoothed trajectory may be smaller than the amount of the future portion(s) of the (observed) trajectory. For example, when determining the smoothed trajectory for a moment (e.g., corresponding to the 1000th video frame) within the capture duration, the amount of the duration subsequent to the moment (e.g., corresponding to the next 30 video frames, corresponding to next second of capture) used may be larger than the amount of the duration preceding the moment (e.g., corresponding to the previous 15 video frames, corresponding to previous 0.5 second of capture).

Figure 5C:
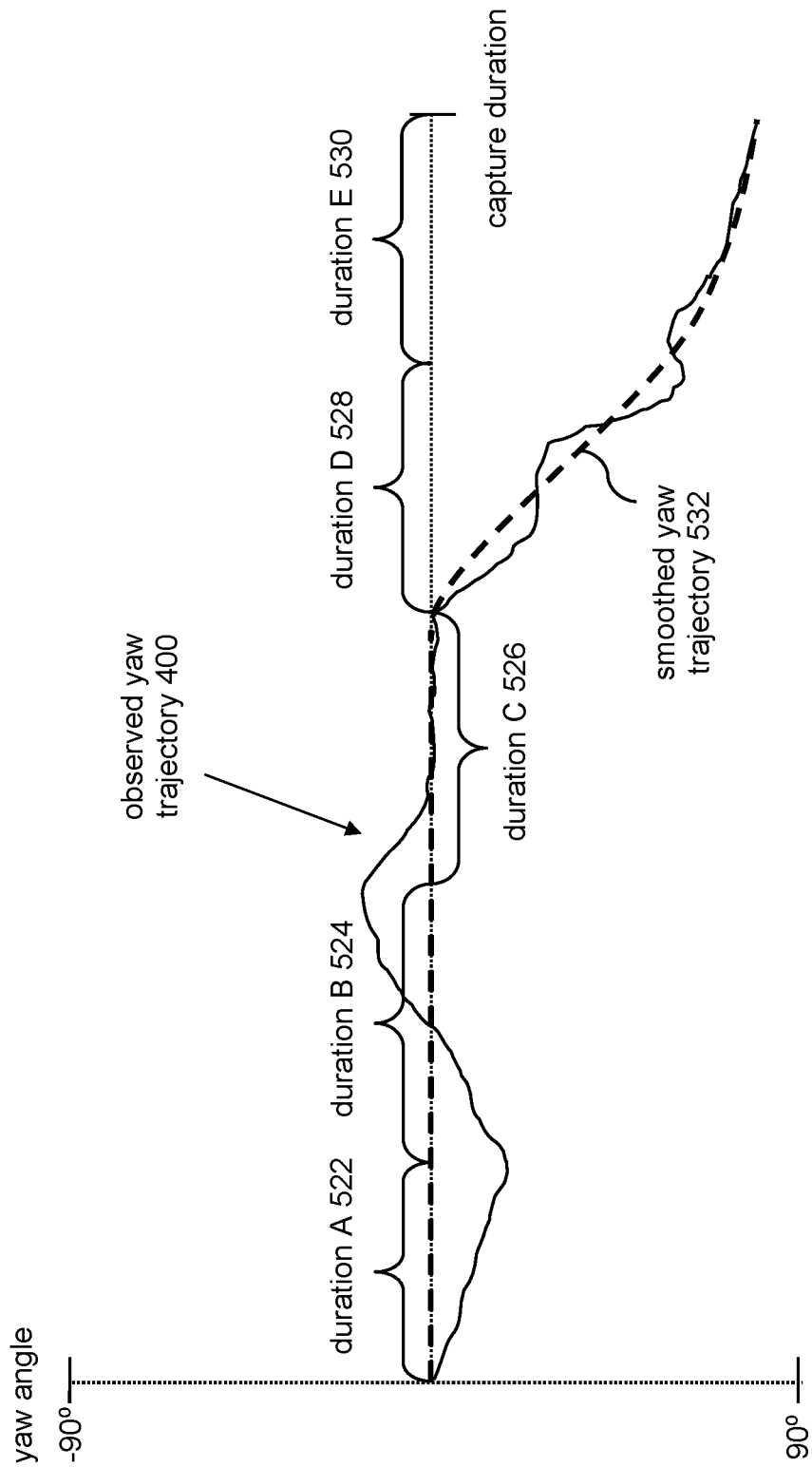
FIG. 5C illustrates an example smoothed trajectory.

FIG. 5C illustrates an example smoothed trajectory determined by the smoothed trajectory component 104. The smoothed trajectory may include a smoothed yaw trajectory 532. The smoothed yaw trajectory 532 may reflect yaw angle positions (e.g., rotational positions defined with respect to a yaw axis, rotation to the left or right) of the image capture device/housing of the image capture device to be used in determining which portions of the visual content (punchouts) may be used to generate a video. For example, the smoothed yaw trajectory 532 may include a zero-rotation about the yaw axis (front-direction) for durations 522, 524, 526 and then a smooth rotation to the right for durations 528, 530. Other types of smoothed trajectory (e.g., smoothed pitch trajectory, smoothed roll trajectory, smoothed translational trajectory) are contemplated.

The smoothed yaw trajectory 532 may be determined such that a portion of the smoothed yaw trajectory 532 corresponding to the portion of the observed yaw trajectory 400 is determined based on a subsequent portion of the observed yaw trajectory 400. For example, the portion of the smoothed yaw trajectory 532 for one or more portions of the duration A 522 may be determined based on the portion(s) of the observed yaw trajectory 400 within the duration B 524 and/or the duration C 526 (look ahead to the duration B 524 and/or the duration C 526). The portion(s) of the observed yaw trajectory 400 for the duration B 524 and/or the duration C 526 may be used to determine in what direction and/or by what amount the smoothed yaw trajectory 532 for portion(s) of the duration A 522 may differ from the observed yaw trajectory 400. The smoothed yaw trajectory 532 may be determined based on subsequent portion(s) of the observed yaw trajectory 400 such that the smoothed yaw trajectory 532 preserves a user's intended motion for the image capture device. For example, based on the subsequent portion(s) (look ahead) of the observed yaw trajectory 400, the smoothed trajectory component 104 may determine that the rotation of the image capture device to the right and left during durations 522, 524 were unintended motions (e.g., the image capture device being unintentionally rotated to the right and the user overcorrecting the rotation to the left), and may determine the smoothed yaw trajectory 532 to be directed to the front during durations 522, 524. Based on the subsequent portion(s) (look ahead) of the observed yaw trajectory 400, the smoothed trajectory component 104 may determine that the staggered rotation of the image capture device to the right during durations 528, 530 included unintended motions (non-continuous rotation to the right), and may determine the smoothed yaw trajectory 532 to include continuous rotation to the right during durations 528, 530. Other determinations of smoothed trajectory are contemplated.

In some implementations, the smoothed trajectory may be determined based on minimization of a rotational velocity of the image capture device/housing of the image capture device and a rotational acceleration of the image capture device/housing of the image capture device while respecting a set of constraints. For example, the smoothed trajectory may be determined by generating a smooth path that respects the set of constraints, rather than by modifying the (observed) trajectory. For instance, a smooth path defining yaw angle position, pitch angle position, and/or roll angle position may be generated by finding a path of the image capture device/housing of the image capture device that minimizes a combination of a time derivative, a second time derivative, and/or other time derivative(s) of the yaw angle position, pitch angle position, and/or roll angle position while respecting the set of constraints:

$$\min\left(\left\|\frac{d}{dt}\theta\right\|^2 + \left\|\frac{d^2}{dt^2}\theta\right\|^2 + ...\right)$$

In some implementations, one or more of the portions of the minimization calculation may be changed. For example, one or more portions of the minimization calculation (e.g., the first time derivative) may be changed to have a greater affect or a lesser affect than other portion(s) of the minimization calculation (e.g., the second time derivative), and/or other factors may be introduced into the calculation.

In some implementations, information on high frequencies (jitters) of image capture may be used to improve visual characteristics of generated video content/stabilized visual content. Certain portion of high frequencies in the input may be kept based on the image capture configuration, such as exposure start time and exposure duration time, the position information (e.g., position sensor readings), and/or other information. For example, motion of the image capture device/image sensor during a frame exposure may be analyzed and used to generate/modify a capture trajectory that minimizes inter-frame motion (e.g., smooths inter-frame motion) while preserving the intra-frame motion, which may contain the high frequencies. This may provide for improved visual characteristics of the generated video content, such as by compensating for motion blur and/or lowlight image capture conditions.

For example, image capture may not happen instantaneously. Rather, it may take a certain amount of time for image sensor pixel sites to gather light. This may lead to splitting of the image sensor motion in time in two phases: inter-frame motion which may not be captured and may be suppressed, and intra-frame motion which may be "encrusted" in the image and may not be removed. Better visual characteristics (e.g., impression) may be provided when the intra-frame motion is taken into account so that the smoothed trajectory is smooth for inter-frame phases while corresponding to the original motion for intra-frame phases. That is, the smoothed trajectory may move/follow in the same direction and with the same speed as during the frame exposure phase, so that its motion is aligned with the motion blur in the image.

In some implementations, an extent to which the smoothed trajectory of the image capture device/housing deviates from the (observed) trajectory of the image capture device/housing may depend on an amount of rotational motion and/or translational motion experienced by the image capture device/housing during the capture duration, an exposure time with which the visual content is captured, and/or other information. That is, the amount of smoothing performed may take into account the amount of rotational and/or translational motion experienced by the image capture device during capture of the visual content and/or the exposure time used by the image capture device to capture the visual content. For example, visual content captured during larger amount of image capture device emotion may result in motion blur within the visual content, and smoothing the trajectory may result in the motion blur becoming more evident (e.g., motion blur becoming bigger, longer) within the stabilized visual content.

Figure 7:
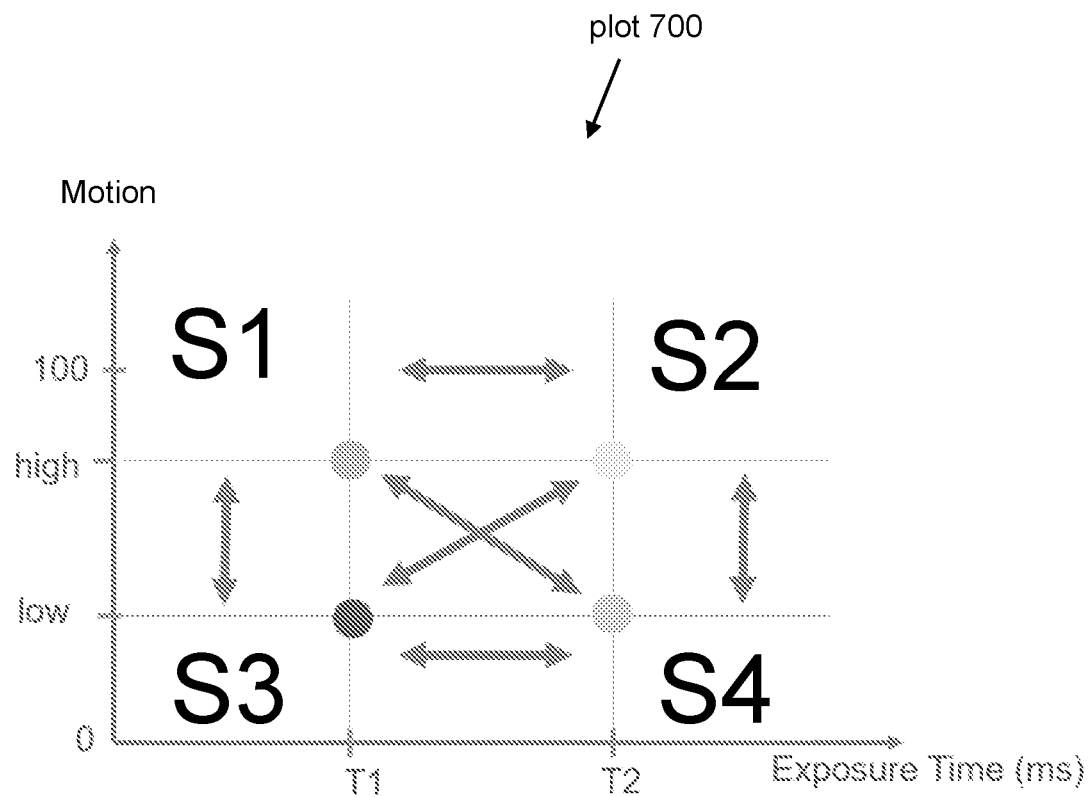
FIG. 7 illustrates an example plot of smoothing values.

The amount of smoothing/stabilization performed/allowed may depend on motion of the image capture device, the exposure time of the image capture device, and/or other information. FIG. 7 illustrates a plot 700 showing different values of smoothing as a function of motion of the image capture device (e.g., values characterizing frequency of motion) and the exposure time with which the image capture device captures visual content. Smoothing values (S1, S2, S3, S4) may refer to the amount of smoothing performed to generate the smoothed trajectory. Smoothing values may impact, characterize, and/or set the power/strength of smoothing/stabilization performed. For example, the smoothing values may range between 0 and 1, with the value of 0 corresponding to no smoothing (deactivating smoothing) and the value of 1 corresponding to regular smoothing (smoothing as described herein). Values between 0 and 1 may correspond to reduced smoothing. For example, a value of 0.5 may correspond to decreasing the smoothing impact by half (e.g., smoothing operating at 50%).

Use of different smoothing values may enable use of different smoothing powers (stabilization strengths) for different capture situations. For example, the smoothing value of S1 may correspond to the amount of smoothing to be used when the exposure time is short (shorter than T1, short exposure time threshold) and image capture device motion is high (e.g., higher than and/or same as high motion threshold). The smoothing value of S2 may correspond to the amount of smoothing to be used when the exposure time is long (longer than T2, long exposure time threshold) and image capture device motion is high. The smoothing value of S3 may correspond to the amount of smoothing to be used when the exposure time is short (shorter than T1) and image capture device motion is low (e.g., lower than and/or same as low motion threshold). The smoothing value of S4 may correspond to the amount of smoothing to be used when the exposure time is long (longer than T2) and image capture device motion is low. Thus, exposure time and image capture device motion may determine the extent of stabilization to be performed on the visual content captured by the image capture device. In some implementations, the exposure time of the image capture device may be automatically adjusted based on light conditions, motion of the image capture device, and/or other information. For example, longer exposure time may be used with low light conditions and shorter exposure time may be used with high light conditions. For instance, referring to FIG. 7, exposure time of less than T1 may be used in high light conditions, exposure time between T1 and T2 may be used in mid light conditions, and exposure time greater than T2 may be used in low light conditions. Higher exposure time may result in greater amount of motion blur within the captured visual content.

One or more of the smoothing values (S1, S2, S3, S4) may be tunable. For example, the values of the smoothing values may be set as follows: S1=1, S2=1, S3=1, and S4=1. Such setting of smoothing values may result in full stabilization of the captured visual content regardless of the image capture device motion and/or exposure time. As another example, the values of the smoothing values may be set as follows: S1=1, S2=0, S3=1, and S4=0. Such setting of smoothing values may result in full stabilization of the captured visual content when the exposure time is shorter than T1 and deactivation of the stabilization of the captured visual content when the exposure time is longer than T2. The smoothing value may change linearly between 0 and 1 as the exposure time increases from T1 to T2. As yet another example, the values of the smoothing values may be set as follows: S1=0.6, S2=0, S3=1, and S4=0.5. Such setting of smoothing values may result in full stabilization of the captured visual content when the exposure time is shorter than T1 and the image capture device motion is low, and deactivation of the stabilization of the captured visual content when the exposure time is longer than T2 and the image capture device motion is high. The stabilization may operate at 60% when the exposure time is shorter than T1 and the image capture device motion is high, and the stabilization may operate at 50% when the exposure time is longer than T2 and the image capture device motion is low. Other values of smoothing values are contemplated. The smoothing values when image capture device motion is between the high motion threshold and the low motion threshold, and the smoothing values when exposure time is between the short exposure time threshold and the long exposure time threshold may be determined as an interpolation of S1, S2, S3, and/or S4.

In some implementations, a set of constraints (including one or more constraints) may be applied in generating the smoothed trajectory. The set of constraints for generating the smoothed trajectory may include one or more constraints that provide limitations/restrictions/rules on how the smooth path/smoothed trajectory is generated. For example, the set of constraints may include a margin constraint that provide limitation(s)/restriction(s)/rule(s) on how far from the (observed) trajectory the smooth path/smoothed trajectory may be generated. The margin constraint may be determined based on a difference between the size of the viewing window for generating a punchout of the visual content and the field of view of the visual content, and/or other information. The field of view of the visual content may refer to the field of view of a scene captured within the visual content. That is, the field of view of the visual content may refer to the spatial extent/angle of the scene captured within the visual content. The size of the viewing window may refer to the field of view of the punchout for generating a video based on visual content. That is, a video may be generated based on visual content of the images within the viewing window. The viewing window may be defined in terms of shape and/or size.

Figure 6A:
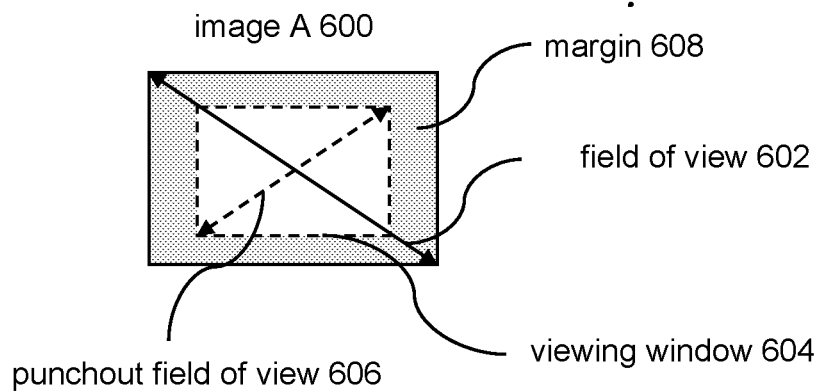
FIG. 6A illustrates an example orientation of a viewing window with respect to an image.

For example, FIG. 6A illustrates an example orientation of a viewing window 604 with respect to an image A 600. The image A 600 may have a field of view 602. The viewing window 604 may have a punchout field of view 606. The image A 600 may include capture of a scene within an angle defined by the field of view 602. The viewing window 604 may provide a punchout of the image A 600 to be used for video generation. The punchout field of view 606 of the viewing window 604 604 may be smaller than the field of view 602. The amount and/or direction from which the smooth path/smoothed trajectory may deviate from the (observed) trajectory may depend on the difference between the field of view 602 and the punchout field of view 606. The difference between the field of view 602 and the punchout field of view 606 (e.g., 10%) may define a margin 608 within which the viewing window 604 may move with respect to the image A 600/field of view 602. The margin 608 may be a stabilization margin, which specifies how much the viewing window may move while remaining inside the field of view of the visual content)

Figure 6B:
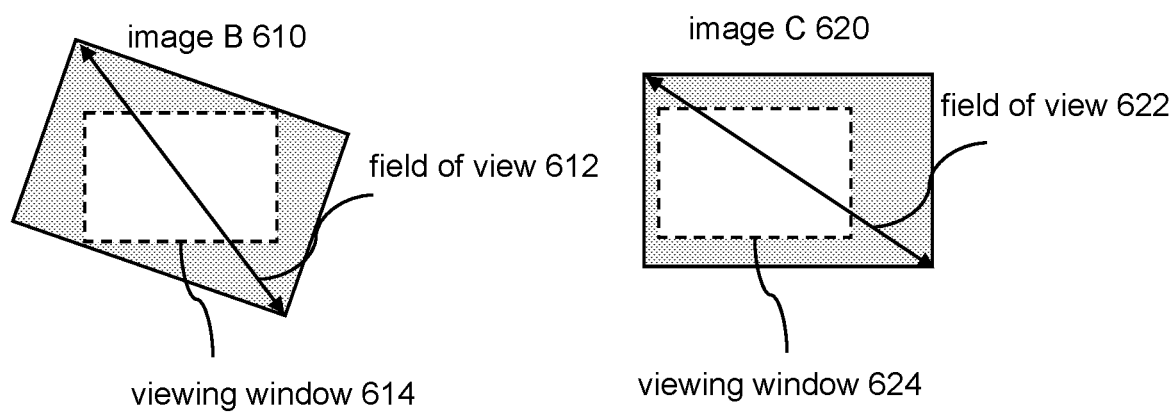
FIG. 6B illustrates example orientations of a viewing window with respect to an image.

For example, referring to FIG. 6B, a viewing window 614 may be rotated with respect to a field of view 612 of an image B 610 while not going beyond the pixels captured within the image B 610. A viewing window 624 may be laterally moved with respect to a field of view 622 of an image C 620 while not going beyond the pixels captured within the image C 620.

Referring back to FIG. 6A, larger difference between the field of view 602 and the viewing window 604/punchout field of view 606 may enable larger movement of the viewing window 604 with respect to the field of view 602 of the image A 600 while smaller difference between the field of view 602 and the viewing window 604/punchout field of view 606 may enable smaller movement of the viewing window 604 with respect to the field of view 602 of the image A 600. However, larger margin 608 may result in waste of pixel space and computing resources (e.g., processor power and/or battery consumption to capture images with larger optical field of view than needed to generate a video).

In some implementations, the set of constraints may include a trajectory constraint that provide limitation(s)/restriction(s)/rule(s) on how the smooth path/smoothed trajectory may be generated based on subsequent portions of the (observed) trajectory. The trajectory constraint may be determined based on a subsequent portion of the (observed) trajectory and/or other information. That is, the trajectory constraint may include one or more constraints relating to shape of the (observed) trajectory in the "future." The trajectory constraint may preserve the intended motion for the image capture device in the generated path.

In some implementations, the set of constraints may include a target constraint that provide limitation(s)/restriction(s)/rule(s) on how the smooth path/smoothed trajectory may be generated based on a target within the images. A target may refer to a person, an object, and/or a thing that may be selected for inclusion in a video. For example, the images captured by the image capture device may include one or more view of a person (e.g., a person of interest) and a user may wish to create a video that includes the person. The target constraint may include one or more constraints relating to the location of the target within the images such that the images are stabilized around the location of the target within the images. That is, the target constraint may affect the generation of the smooth path/smoothed trajectory so that the target is within one or more of the punchouts of the visual content. Other constraints are contemplated.

In some implementations, a set of parameters (including one or more parameters) may control the generation of the smoothed trajectory. The set of parameters for generating the smoothed trajectory may include one or more parameters that influence and/or direct how the smooth path/smoothed trajectory is generated. For example, the set of parameters may include a weight-balance parameter, a low-light high-pass parameter, a stickiness parameter, and/or other parameters.

A weight-balance parameter may refer to a parameter that controls the types of motion that are minimized in generation of the smoothed trajectory. For example, types of motion that may be minimized to generate the smoothed trajectory/smooth path may include rotational velocity, rotational acceleration, translational velocity, translational acceleration and/or other motions. For instance, a weight-balance parameter (value of the weight-balance parameter) may control to what extent a combination of rotational velocity and rotational acceleration is minimized when determining the smoothed trajectory. The weight-balance parameter may range between 0 and 1, with 0 corresponding to minimization of angular velocity and 1 corresponding to minimization of angular acceleration. A value between 0 and 1 may correspond to minimization of both angular velocity and angular acceleration, with minimization of different types of motion weighed according to the value. Other values of the weight-balance parameter are contemplated.

Sole minimization of angular velocity may result in a smoothed trajectory that prefers to keep a steady position when possible and may result in piecewise-linear sharp-corners in the smoothed trajectory. Sole minimization of angular velocity may minimize apparent motion between video frames, but the resulting motion may appear unnatural. Sole minimization of angular acceleration may result in a smoothed trajectory with no/reduced number of corner points. Sole minimization of angular acceleration may result a constant velocity and may produce more motion than Sole minimization of angular velocity. Minimization of a combination of angular velocity and angular acceleration may provide for an in-between generation of smoothed trajectory (with different minimization weighted according to the value of the weight-balance parameter).

A low-light high-pass parameter may refer to a parameter that controls the amount/strength of smoothing performed to generate the smoothed trajectory. For trajectory smoothing/visual content stabilization, motion of the image capture device may be categorized into (1) inter-frame motion, and (2) intra-frame motion. Inter-frame motion may refer to motion between frame exposure periods. Inter-frame motion may be attenuated based on the margin constraint. Intra-frame motion may refer to motion of the image capture device during an exposure period of individual video frames. The motion may be encrusted in the video frames through the motion blur, and attenuation of the intra-frame motion may result in motion blur pulsations that create poor visual impression. Such visual defect may be reduced by having the smoothed trajectory follow the (observed) trajectory during the exposure periods.

A low-light high-pass parameter may range between 0 and 1, with 0 corresponding to no motion blur compensation and 1 corresponding to full motion blur compensation. The low-light high-pass parameter of 0 may result in the observed motion being fully attenuated and no image capture device motion during the exposure periods being taken into account. The low-light high-pass parameter of 1 may result in the smoothed trajectory being same as the (observed) trajectory during the exposure periods. That is, the output motion may include high frequencies that mask motion blur within the visual content. A value between 0 and 1 may change the amount/strength of the smoothing performed to generate the smoothed trajectory. Other values of the low-light high-pass parameter are contemplated.

A stickiness parameter may refer to a parameter that control the extent by which preceding portion(s) of the (observed) trajectory impacts determination of the smoothed trajectory. A stickiness parameter may range between 0 and 1. The stickiness parameter of 1 may result in a "lazy" stabilizer that maximizes the impact of the preceding motion/position, unless the future motion/position indicate that the lazily determined smoothed trajectory will result in the violation of the margin constraint. The stickiness parameter of 0 may result in the smoothed trajectory being generated without taking the preceding portion(s) of the (observed) trajectory into account. A value between 0 and 1 may change the extent by which preceding portion(s) of the (observed) trajectory impacts determination of the smoothed trajectory. The value of the stickiness parameter may impact bootstrapping—the value of the stickiness parameter may determine how the positions of an image capture device/housing and the optimal estimates of the positions are weighed to form initial estimates of the smoothed trajectory. Other values of the stickiness parameter are contemplated.

The viewing window component 106 may be configured to determine one or more viewing windows for the visual content based on the smoothed trajectory of the image capture device/housing and/or other information. Placement of a viewing window for the visual content with respect to the field of view of the visual content captured at a moment may be determined based on the corresponding position (rotational position, translational position) of the image capture device/housing within the smoothed trajectory at the moment and/or other information.

A viewing window may define one or more extents of the visual content. A viewing window may define extent(s) of the visual content to be included within a punchout of the visual content as the function of progress through the progress length of the visual content. The progress length of the visual content may be the same as or determined based on the capture duration of the visual content. A viewing window may define extent(s) of the visual content included within a video generated from the visual content. For example, a viewing window may define which spatial portions of the visual content captured by the image capture device during the capture duration is presented on display(s) and/or included within stabilized visual content.

A viewing window may be characterized by viewing directions, viewing sizes (e.g., viewing zoom, viewing magnification), viewing rotations, and/or other information. A viewing direction may define a direction of view for visual content. A viewing direction may define the angle/visual portion of the visual content at which the viewing window may be directed. A viewing direction may be defined based on rotation about an axis that defines lateral movement of the viewing window (e.g., yaw). A viewing direction may be defined based on rotation about an axis that defines vertical movement of the viewing window (e.g., pitch). The yaw and pitch values of the viewing direction may determine the location of the viewing window within captured images/video frames.

A viewing size may define a size of the viewing window. A viewing size may define a size (e.g., size, magnification, viewing angle) of viewable extents of visual content. A viewing size may define the dimensions of the viewing window. In some implementations, a viewing size may define different shapes of the viewing window/viewable extents. For example, a viewing window may be shaped as a rectangle, a triangle, a circle, and/or other shapes. A viewing rotation may define a rotation of the viewing window. A viewing rotation may define one or more rotations of the viewing window about one or more axis. For example, a viewing rotation may be defined based on rotation about an axis corresponding to a viewing direction (e.g., roll).

The viewing window(s) may be determined as the function of progress through the capture duration. That is, one or more of viewing direction, viewing rotation, and/or viewing size may be determined for different parts of the capture duration. For example, different placement (determined based on viewing direction, viewing rotation, and/or viewing size) of the viewing window may be determined for different parts of the capture duration. The viewing window(s) may be determined for different time points and/or different time durations within the capture duration. The viewing window(s) may be determined for different images/video frames and/or different groups of images/video frames captured during the capture duration.

A viewing window may be used to provide a punchout of the visual content. A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). A viewing window may define extents of the visual content to be included within a punchout of the visual content as the function of progress through the progress length/capture duration of the visual content. A viewing window may correspond to the entire duration of the progress length/capture duration or for one or more portions (e.g., portions including moments of interest) of the progress length/capture duration. The punchout of the visual content may be presented on one or more displays, included in one or more videos, and/or otherwise used for presenting the visual content.

Determining a viewing window for visual content based on the smoothed trajectory may include determining one or more of viewing direction, viewing rotation, and/or viewing size of the viewing window based on the smoothed trajectory. That is, determining a viewing window for visual content may include determining orientations of the viewing window with respect to the field of view of the visual content based on the smoothed trajectory. Placement (viewing direction, viewing rotation, and/or viewing size) of the viewing window at different moments may be determined based on corresponding positions/values of the smoothed trajectory. The orientations of the viewing window with respect to the field of view of the visual content may determine which portions of the visual content (punchouts) may be used to generate a video. That is, the viewing window component 106 may determine how the punchouts for the visual content may be oriented with respect to the field of view of the visual content.

The viewing window component 106 may be configured to determine how the viewing window should be oriented with respect to the field of view of the visual content (images, video frames) based on the smoothed trajectory. The viewing window component 106 may determine how the punchouts for the visual content may be laterally and/or vertically positioned with respect to the field of view of the visual content based on the smoothed trajectory. The viewing window component 106 may determine how the punchouts for the visual content may be rotated with respect to the field of view of the visual content based on the smoothed trajectory.

The viewing window may be oriented with respect to the field of view of the visual content to provide a punchout of the visual content that is stable with respect to prior and/or next punchout of the visual content. For example, the viewing window may be oriented with respect to the field of view of images/video frames captured by the image capture device to provide a punchout of the images/video frames such that the presented content appears to have been captured with a stable/more stable image capture device (e.g., a punchout of a video frame being stable/more stable with a punchout of the preceding video frame and/or a subsequent video frame).

For example, referring to FIG. 6B, the viewing window component 106 may determine the orientation of the viewing window 614 with respect to the field of view 612 of the image B 610 based on the smoothed trajectory at a moment corresponding to the image B 610. The viewing window 614 may be oriented with respect to the field of view 612 to provide a punchout of the image B 610 that is stable with respect to a prior and/or next punchout of the images (e.g., stable with the punchout of the image A 600 using the viewing window 604 for the image A 600, shown in FIG. 6A). The viewing window component 106 may determine the orientation of the viewing window 624 with respect to the field of view 622 of the image C 620 based on the smoothed trajectory at a moment corresponding to the image C 620. The viewing window 624 may be oriented with respect to the field of view 622 to provide a punchout of the image C 620 that is stable with respect to a prior and/or next punchout of the images (e.g., stable with the punchout of the image B 610 using the viewing window 614 for the image B 610).

The generation component 108 may be configured to generate stabilize visual content of one or more videos based on the viewing window(s) and/or other information. The stabilized visual content may include a punchout of the extent(s) of the visual content within the viewing window(s). Stabilized visual content may be generated as video frames including extent(s) of the visual content within the viewing window(s). Stabilized visual content may be generated as outputs of portions of the visual captured by the image capture device, with the outputted portions including extent(s) of the visual content within the viewing window(s). Inclusion of the extent(s) of the visual content within the viewing windows in video may effectuate stabilization of the visual content via selective cropping. The portions of the visual content that is cropped for stabilization may depend on the smoothed trajectory and/or other information. The portions of the visual content that is cropped for stabilization may depend on one or more of the weight-balance parameter, the low-light high-pass parameter, the stickiness parameter, and/or other parameters.

Video content may refer media content that may be consumed as one or more videos/video clips. Video content may include one or more videos/video clips stored in one or more formats/containers, and/or other video content. A format may refer to one or more ways in which the information defining video content is arranged/laid out (e.g., file format). A container may refer to one or more ways in which information defining video content is arranged/laid out in association with other information (e.g., wrapper format). Video content may define visual content viewable as a function of progress through a progress length of the video content. Video content may include video frames that define visual content. That is, visual content of the video content may be included within video frames of the video content.

The video frames of the video content may be determined based on visual content of the visual content within the viewing window and/or other information. The video frames of the video content may be determined based on a punchout of the visual content in accordance with the smoothed trajectory, the viewing window, and/or other information. For example, referring to FIGS. 6A-6B, the video frames of the video content may be determined based on the visual content of the image A 600 within the viewing window 604, the visual content of the image B 610 within the viewing window 614, the visual content of the image C 620 within the viewing window 624, and/or other information. Such determination of extents of visual content for inclusion in video content may effectuate stabilization of the video content.

In some implementations, the video frames of the video content may be determined based on warping of images (e.g., one or more portions of the visual content of the images). The warping of the images may provide for different perspectives of content captured within the images, with the different perspectives corresponding to how the content would have look had the images been captured from the image capture device on the capture trajectory.

In some implementations, visual content (e.g., images, video frames) and/or one or more of the portions of visual content used to generate video content may be stored in one or more buffers (e.g., 1 s buffer, circular buffer). The buffer(s) may be used to store visual content/portions of visual content that may be used (e.g., included in a punchout, warped) to generate stabilized visual content. The buffer(s) may be used to store other information, such as visual information, position information, and/or other information for look ahead and/or trajectory generation. For example, the buffer(s) may be used to store images/video frames for which trajectory generation is being performed using look ahead. After corresponding portion of the smoothed trajectory is generated, the relevant portions of the images (visual content of the images within the viewing window) in the buffer(s) may be used to generate the video content.

The video content generated by the generation component 108 may be defined by video information. Video information defining video content may define an encoded version/copy of the video content and/or instructions for rendering the video content. For example, the video information may define an encoded version/copy of the video content/video frames, and the video information (e.g., video file) may be opened in a video player for presentation of the video content. The video information may define instructions to render the video content for presentation. For example, the video information may define a director track that includes information as to which visual portions of the visual content (images, video frames) should be included within the presentation of the video content. The director track may include information on the location, size, shape, and/or rotation of the punchout of images/video frames to be used to as a function progress through the video content to provide a stabilized view of the images/video frames. A video player may use the director track to retrieve the relevant visual portions of the images/video frames when the video content is opened and/or is to be presented.

The generation component 108 may be configured effectuate storage of the video information and/or other information in one or more storage media. For example, the video information may be stored in the electronic storage 13, remote storage locations (storage media located at/accessible through a server), and/or other locations. In some implementations, the generation component 108 may effectuate storage of the video information through one or more intermediary devices. For example, the processor 11 may be located within a computing device without a connection to the storage device (e.g., the computing device lacks WiFi/cellular connection to the storage device). The generation component 108 may effectuate storage of the video information through another device that has the necessary connection (e.g., the computing device using a WiFi/cellular connection of a paired mobile device, such as a smartphone, tablet, laptop, to store information in one or more storage media). Other storage locations for and storage of the video information are contemplated.

In some implementations, the processor 11 may represent multiple processors, and at least one of the processors may be a remote processor located remotely from the housing of the image capture device (e.g., the image capture device 302). One or more of the functionalities of the components 102, 104, 106, 108 may be performed by the image capture device 302 (e.g., by the processor 310) and/or by a remote processor. For example, one or more of trajectory determination (functionalities of the trajectory component 102), smoothed trajectory determination (functionalities of the smoothed trajectory component 104), viewing window determination (functionalities of the viewing window component 106), and/or stabilized visual content generation (functionality of the generation component 108) may be performed by the remote processor post capture of the visual content by the image capture device.

The image capture device may capture the position information and the visual content but may not stabilize the visual content in real time. For example, the image capture device may not have sufficient resource to apply the stabilization technique described herein in real-time and/or may be devoting its resources to other tasks. The stabilization of the visual content may be performed by the image capture device once sufficient resource becomes available. The stabilization of the visual content may be performed by the remote processor. For example, the remote processor may be one or more processors of a remote computing device (e.g., mobile device, desktop, server), and the remote processor may receive visual information and the position information captured/generated by the image capture device. The remote computing device (software running on the remote computing device) may apply the stabilization technique described herein post capture of the visual content by the image capture device. The post-capture stabilization of the visual content may be performed by the remote processor responsive to reception of the visual information and position information, responsive to user/system command to stabilize the visual content, responsive to the visual content being opened for playback, and/or responsive to other conditions.

While the description herein may be directed to images and videos, one or more other implementations of the system/method described herein may be configured for other types media content. Other types of media content may include one or more of audio content (e.g., music, podcasts, audiobooks, and/or other audio content), multimedia presentations, images, slideshows, visual content (e.g., one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
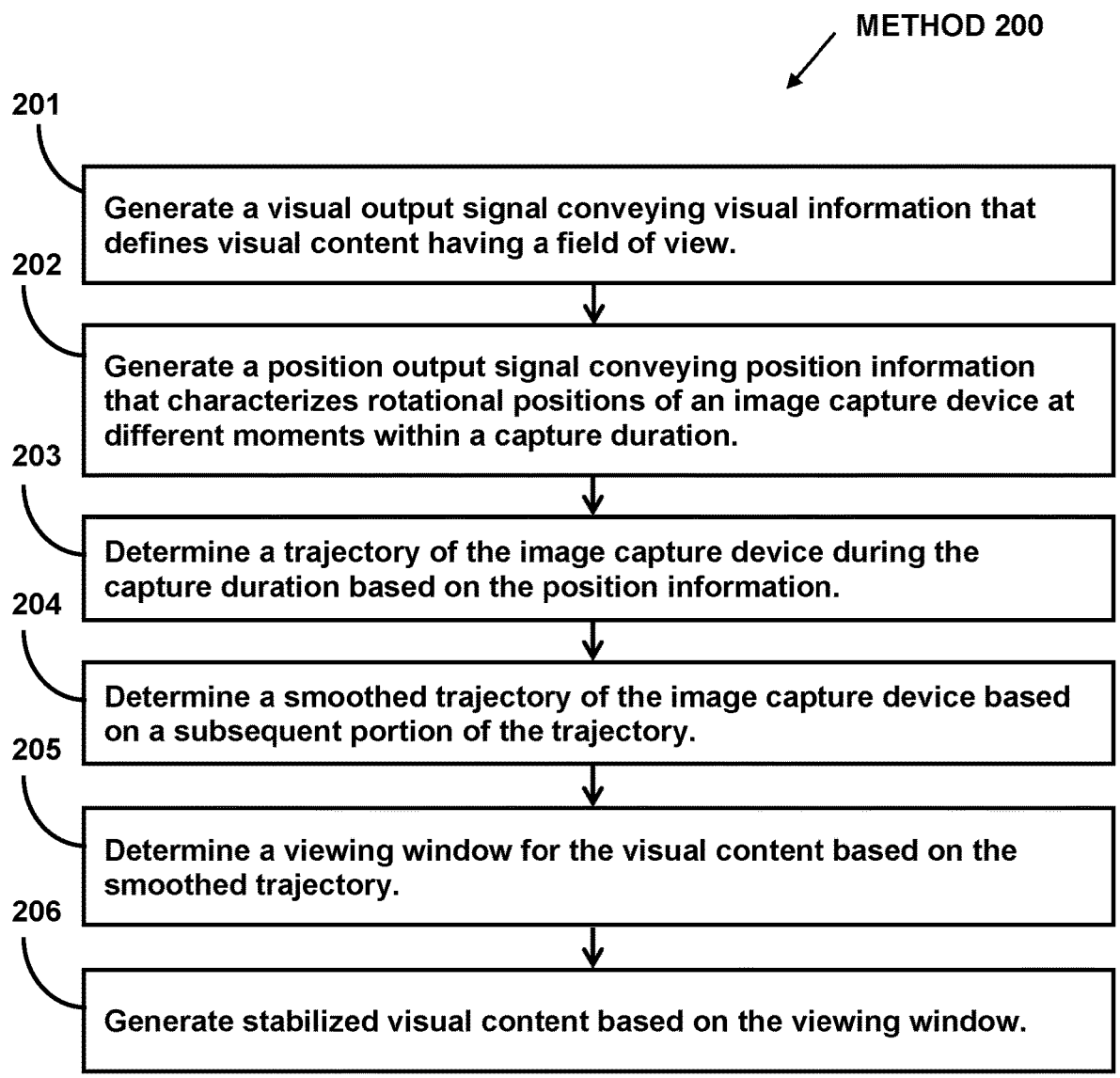
FIG. 2 illustrates an example method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a visual output signal may be generated. The visual output signal may convey visual information that defines visual content having a field of view. In some implementations, operation 201 may be performed by a component the same as or similar to the image sensor 306 (Shown in FIG. 3 and described herein).

At operation 202, a position output signal may be generated. The position output signal may convey position information that characterizes rotational positions of an image capture device at different moments within a capture duration. In some implementations, operation 202 may be performed by a component the same as or similar to the position sensor 308 (Shown in FIG. 3 and described herein).

At operation 203, a trajectory of the image capture device during the capture duration may be determined based on the position information. In some implementations, operation 203 may be performed by a processor component the same as or similar to the trajectory component 102 (Shown in FIG. 1 and described herein).

At operation 204, a smoothed trajectory of the image capture device may be determined based on a subsequent portion of the trajectory. In some implementations, operation 204 may be performed by a processor component the same as or similar to the smoothed trajectory component 104 (Shown in FIG. 1 and described herein).

At operation 205, a viewing window for the visual content may be determined based on the smoothed trajectory. The viewing window may define one or more extents of the visual content. In some implementations, operation 205 may be performed by a processor component the same as or similar to the viewing window component 106 (Shown in FIG. 1 and described herein).

At operation 206, stabilized visual content may be generated based on the viewing window. The stabilized visual content may include a punchout of the extent(s) of the visual content within the viewing window. In some implementations, operation 206 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising: one or more physical processors configured by machine-readable instructions to:
   generate a trajectory of an image capture device during a capture duration, the image capture device capturing images having a field of view during the capture duration, the trajectory reflecting positions of the image capture device at different moments within the capture duration, the trajectory including a first portion corresponding to a first moment within the capture duration and a second portion corresponding to a second moment subsequent to the first moment within the capture duration;
   generate a smoothed trajectory of the image capture device based on a look ahead of the trajectory of the image capture device, the smoothed trajectory reflecting actual and/or virtual positions of the image capture device at the different moments within the capture duration, wherein generation of the smoothed trajectory of the image capture device based on the look ahead of the trajectory of the image capture device includes generation of a portion of the smoothed trajectory corresponding to the first portion of the trajectory based on the second portion of the trajectory, wherein the generation of the portion of the smoothed trajectory corresponding to the first portion of the trajectory based on the second portion of the trajectory includes:
      obtaining a position of the image capture device at the first moment within the capture duration, the first moment being a point in time and corresponding to a video frame captured at the point in time within the capture duration;
      obtaining positions of the image capture device at the second moment within the capture duration, the second moment being a duration of time subsequent to the point in time within the capture duration; and
      determining a corresponding position of the image capture device within the smoothed trajectory at the first moment based on the position of the image capture device at the point in time and the positions of the image capture device during the duration of time subsequent to the point in time, wherein the corresponding position of the image capture device within the smoothed trajectory at the first moment is initially determined based on a combination of the position of the image capture device at the first moment and an estimate of the corresponding position of the image capture device; and
   generate stabilized visual content of a video based on the images and the smoothed trajectory of the image capture device.

2. The system of claim 1, wherein generation of the stabilized visual content of the video based on the images and the smoothed trajectory of the image capture device includes:
   determination of placement of a viewing window with respect to the field of view of the images based on the smoothed trajectory of the image capture device; and generation of the stabilized visual content based on one or more extents of the images included within the viewing window.

3. The system of claim 1, wherein at least one of the one or more physical processors is a remote processor located remotely from the image capture device, and generation of the stabilized visual content is performed by the remote processor post capture of the images.

4. The system of claim 1, wherein the one or more physical processors are carried by the image capture device, and generation of the stabilized visual content is performed during capture of the images.

5. The system of claim 1, wherein the estimate of the corresponding position of the image capture device is determined based on minimization of a combination of a rotational velocity of the image capture device and a rotational acceleration of the image capture device.

6. A system for stabilizing videos, the system comprising:
one or more physical processors configured by machine-readable instructions to:
generate a trajectory of an image capture device during a capture duration, the image capture device capturing images having a field of view during the capture duration, the trajectory reflecting positions of the image capture device at different moments within the capture duration;
generate a smoothed trajectory of the image capture device based on a look ahead of the trajectory of the image capture device, the smoothed trajectory reflecting actual and/or virtual positions of the image capture device at the different moments within the capture duration, wherein a strength of smoothing applied to the trajectory of image capture device to generate the smoothed trajectory of the image capture device is determined based on an amount of motion experienced by the image capture device and an exposure time with which the images are captured; and
generate stabilized visual content of a video based on the images and the smoothed trajectory of the image capture device.

7. The system of claim 6, wherein:
the trajectory includes a first portion corresponding to a first moment within the capture duration and a second portion corresponding to a second moment subsequent to the first moment within the capture duration; and
generation of the smoothed trajectory of the image capture device based on the look ahead of the trajectory of the image capture device includes generation of a portion of the smoothed trajectory corresponding to the first portion of the trajectory based on the second portion of the trajectory.

8. The system of claim 1, wherein the generation of the portion of the smoothed trajectory corresponding to the first portion of the trajectory based on the second portion of the trajectory includes:
obtaining a position of the image capture device at the first moment within the capture duration, the first moment being a point in time and corresponding to a video frame captured at the point in time within the capture duration;
obtaining positions of the image capture device at the second moment within the capture duration, the second moment being a duration of time subsequent to the point in time within the capture duration; and
determining a corresponding position of the image capture device within the smoothed trajectory at the first moment based on the position of the image capture device at the point in time and the positions of the image capture device during the duration of time subsequent to the point in time.

9. The system of claim 6, wherein at least one of the one or more physical processors is a remote processor located remotely from the image capture device, and generation of the stabilized visual content is performed by the remote processor post capture of the images.

10. The system of claim 6, wherein the one or more physical processors are carried by the image capture device, and generation of the stabilized visual content is performed during capture of the images.

11. A method for stabilizing videos, the method performed by a computing system including one or more processors, the method comprising:
generating, by the computing system, a trajectory of an image capture device during a capture duration, the image capture device capturing images having a field of view during the capture duration, the trajectory reflecting positions of the image capture device at different moments within the capture duration, the trajectory including a first portion corresponding to a first moment within the capture duration and a second portion corresponding to a second moment subsequent to the first moment within the capture duration;
generating, by the computing system, a smoothed trajectory of the image capture device based on a look ahead of the trajectory of the image capture device, the smoothed trajectory reflecting actual and/or virtual positions of the image capture device at the different moments within the capture duration, wherein generating the smoothed trajectory of the image capture device based on the look ahead of the trajectory of the image capture device includes generating a portion of the smoothed trajectory corresponding to the first portion of the trajectory based on the second portion of the trajectory, wherein generating the portion of the smoothed trajectory corresponding to the first portion of the trajectory based on the second portion of the trajectory includes:
obtaining a position of the image capture device at the first moment within the capture duration, the first moment being a point in time and corresponding to a video frame captured at the point in time within the capture duration;
obtaining positions of the image capture device at the second moment within the capture duration, the second moment being a duration of time subsequent to the point in time within the capture duration; and
determining a corresponding position of the image capture device within the smoothed trajectory at the first moment based on the position of the image capture device at the point in time and the positions of the image capture device during the duration of time subsequent to the point in time, wherein the corresponding position of the image capture device within the smoothed trajectory at the first moment is initially determined based on a combination of the position of the image capture device at the first moment and an estimate of the corresponding position of the image capture device; and
generating, by the computing system, stabilized visual content of a video based on the images and the smoothed trajectory of the image capture device.

12. The method of claim 11, wherein generating the stabilized visual content of the video based on the images and the smoothed trajectory of the image capture device includes:
   determining placement of a viewing window with respect to the field of view of the images based on the smoothed trajectory of the image capture device; and
   generating the stabilized visual content based on one or more extents of the images included within the viewing window.

13. The method of claim 11, wherein at least one of the one or more processors is a remote processor located remotely from the image capture device, and generation of the stabilized visual content is performed by the remote processor post capture of the images.

14. The method of claim 11, wherein the one or more processors are carried by the image capture device, and generation of the stabilized visual content is performed during capture of the images.

15. The method of claim 11, wherein the estimate of the corresponding position of the image capture device is determined based on minimization of a combination of a rotational velocity of the image capture device and a rotational acceleration of the image capture device.

16. A method for stabilizing videos, the method performed by a computing system including one or more processors, the method comprising:
   generating, by the computing system, a trajectory of an image capture device during a capture duration, the image capture device capturing images having a field of view during the capture duration, the trajectory reflecting positions of the image capture device at different moments within the capture duration;
   generating, by the computing system, a smoothed trajectory of the image capture device based on a look ahead of the trajectory of the image capture device, the smoothed trajectory reflecting actual and/or virtual positions of the image capture device at the different moments within the capture duration, wherein a strength of smoothing applied to the trajectory of image capture device to generate the smoothed trajectory of the image capture device is determined based on an amount of motion experienced by the image capture device and an exposure time with which the images are captured; and
   generating, by the computing system, stabilized visual content of a video based on the images and the smoothed trajectory of the image capture device.

17. The method of claim 16, wherein:
   the trajectory includes a first portion corresponding to a first moment within the capture duration and a second portion corresponding to a second moment subsequent to the first moment within the capture duration; and
   generating the smoothed trajectory of the image capture device based on the look ahead of the trajectory of the image capture device includes generating a portion of the smoothed trajectory corresponding to the first portion of the trajectory based on the second portion of the trajectory.

18. The method of claim 17, wherein generating the portion of the smoothed trajectory corresponding to the first portion of the trajectory based on the second portion of the trajectory includes:
   obtaining a position of the image capture device at the first moment within the capture duration, the first moment being a point in time and corresponding to a video frame captured at the point in time within the capture duration;
   obtaining positions of the image capture device at the second moment within the capture duration, the second moment being a duration of time subsequent to the point in time within the capture duration; and
   determining a corresponding position of the image capture device within the smoothed trajectory at the first moment based on the position of the image capture device at the point in time and the positions of the image capture device during the duration of time subsequent to the point in time.

19. The method of claim 16, wherein at least one of the one or more processors is a remote processor located remotely from the image capture device, and generation of the stabilized visual content is performed by the remote processor post capture of the images.

20. The method of claim 16, wherein the one or more processors are carried by the image capture device, and generation of the stabilized visual content is performed during capture of the images.

* * * * *